(12) United States Patent
Wang et al.

(10) Patent No.: US 10,812,835 B2
(45) Date of Patent: Oct. 20, 2020

(54) ENCODING METHOD AND APPARATUS AND DECODING METHOD AND APPARATUS

(71) Applicant: HUAWEI TECHNOLOGIES CO., LTD., Shenzhen, Guangdong (CN)

(72) Inventors: Zhao Wang, Beijing (CN); Siwei Ma, Beijing (CN); Shan Gao, Shenzhen (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 16/233,932

(22) Filed: Dec. 27, 2018

(65) Prior Publication Data

US 2019/0273950 A1    Sep. 5, 2019

Related U.S. Application Data

(63) Continuation of application No. PCT/CN2017/090063, filed on Jun. 26, 2017.

(30) Foreign Application Priority Data

Jun. 30, 2016    (CN) .......................... 2016 1 0512291

(51) Int. Cl.
*H04N 19/96* (2014.01)
*H04N 19/176* (2014.01)
(Continued)

(52) U.S. Cl.
CPC .......... *H04N 19/96* (2014.11); *H04N 19/119* (2014.11); *H04N 19/157* (2014.11); *H04N 19/176* (2014.11); *H04N 19/167* (2014.11)

(58) Field of Classification Search
None
See application file for complete search history.

(56) References Cited

U.S. PATENT DOCUMENTS

| 2012/0177116 A1 | 7/2012 | Panusopone et al. |
| 2013/0022129 A1 | 1/2013 | Liu et al. |
| 2015/0036758 A1 | 2/2015 | Sato |

FOREIGN PATENT DOCUMENTS

| CN | 102611885 A | 7/2012 |
| CN | 102761742 A | 10/2012 |

(Continued)

OTHER PUBLICATIONS

Jicheng An et al., "Block partitioning structure for next generation video coding", MPEP Meeting Oct. 19, 2015-Oct. 23, 2015; Generva; Motion Picture Expert Group or ISO/IEC JTC1/SC29/WG11, No. m37524, Oct. 26, 2015 (Oct. 26, 2015), XP030065891 (Year: 2015).*

(Continued)

*Primary Examiner* — Stuart D Bennett
(74) *Attorney, Agent, or Firm* — Fish & Richardson P.C.

(57) ABSTRACT

A decoding method includes: parsing a data stream, and if partitioning an image block with a size of 2N×2N using a quadtree partition pattern is allowed, processing a 2N×N first subimage block and a 2N×2N second subimage block or an N×2N first subimage block and an N×2N second subimage block in a constraint subimage processing mode, wherein an image block partition pattern obtained for the partitioned second subimage block and the partitioned first subimage block is different from an image block partition pattern obtained after the 2N×2N image block is partitioned using the quadtree partition pattern, where the 2N×N first subimage block and the 2N×N second subimage block or the N×2N first subimage block and the N×2N second subimage block are obtained by partitioning the image block with the size of 2N×2N.

34 Claims, 19 Drawing Sheets

(51) Int. Cl.
*H04N 19/119* (2014.01)
*H04N 19/157* (2014.01)
*H04N 19/167* (2014.01)

(56) References Cited

FOREIGN PATENT DOCUMENTS

| | | |
|---|---|---|
| CN | 103703775 A | 4/2014 |
| CN | 103747272 A | 4/2014 |
| WO | 2012096809 A1 | 7/2012 |

OTHER PUBLICATIONS

International Organization for Standardization: "Algorithm Description of Joint Exploration Test Model 1 (JEM1)", ISO/IEC JTC1/SC29/WG11/N15790, Dec. 11, 2015 (Dec. 11, 2015), XP03022473 (Year: 2015).*

ITU-T H.263, Series H: Audiovisual and Multimedia Systems Infrastructure of audiovisual services—Coding of moving video, Video coding for low bit rate communication, Jan. 2005, 226 pages.

ITU-T H.263 Implementors' Guide, Series H: Audiovisual and Multimedia Systems Coding of moving video, Aug. 5, 2005, 10 pages.

ITU-T H.264, Series H: Audiovisual and Multimedia Systems Infrastructure of audiovisual services—Coding of moving video Advanced video coding for generic audiovisual services. Feb. 2016, 807 pages.

ITU-T H.265, Series H: Audiovisual and Multimedia Systems Infrastructure of audiovisual services—Coding of moving video High efficiency video coding, Apr. 2015, 634 pages.

International Search Report and Written Opinion issued in International Application No. PCT/CN2017/090063 dated Aug. 30, 2017, 19 pages.

Office Action issued in Chinese Application No. 201610512291.1 dated May 7, 2019, 7 pages.

Jicheng An et al: "Block partitioning structure for next generation video coding", Oct. 2015. XP030065891. 8 pages.

International Organization for Standardization:"Algorithm Description of Joint Exploration Test Model 1 (JEM1)" , ISO/IEC JTC 1/SC29/WG11/N 15790, 2015, XP030022473. 28 pages.

Chen J et al: "Algorithm description of Joint Exploration Test Model 6 (JEM6)", JVET-F1001, May 2017. XP030150793. 50 pages.

Extended European Search Report issued in European Application No. 17819204.3 dated Apr. 2, 2019, 12 pages.

* cited by examiner

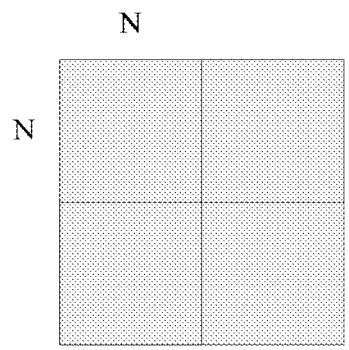
FIG. 9
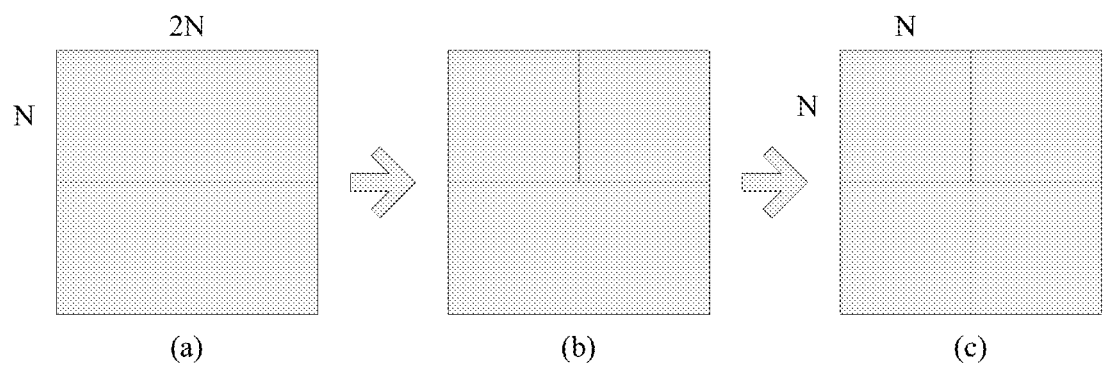
10(a)
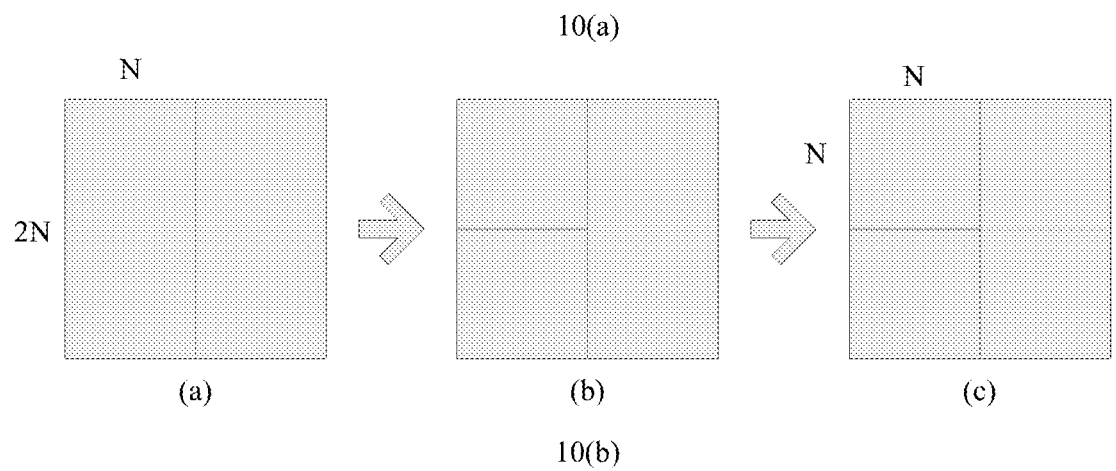
10(b)
FIG. 10

150

┌─────────────────────────────────────────────┐
│ When partitioning an image block with a size of 2N×2N by │
│ using a quadtree partition pattern is allowed, process a 2N×N │
│ first subimage block and a 2N×N second subimage block or an │
│ N×2N first subimage block and an N×2N second subimage │
│ block in a constraint subimage processing mode, where the │ — 152
│ 2N×N first subimage block and the 2N×N second subimage │
│ block or the N×2N first subimage block and the N×2N second │
│ subimage block are obtained by partitioning the image block │
│ with the size of 2N×2N, and the constraint subimage │
│ processing mode includes the following steps │
└─────────────────────────────────────────────┘
                        ↓
┌─────────────────────────────────────────────┐
│ Determine a partition pattern of the first subimage, encode the │
│ partition pattern of the first image block, and encode the first │
154 — │ subimage block based on the partition pattern of the first │
│ subimage block │
└─────────────────────────────────────────────┘
                        ↓
┌─────────────────────────────────────────────┐
│ Determine a partition pattern of the second subimage block, │
│ encode the partition pattern of the second image block, and │
│ encode the second subimage block based on the partition │
│ pattern of the second subimage block, where the partition │
│ pattern of the second subimage block is constrained by the │ — 156
│ partition pattern of the first subimage block, so that an image │
│ block partition pattern presented for the partitioned second │
│ subimage block and the partitioned first subimage block is │
│ different from an image block partition pattern obtained after │
│ the 2N×2N image block is partitioned by using the quadtree │
│ partition pattern │
└─────────────────────────────────────────────┘

Parse a data stream, and when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N  — 162

Parse the data stream to determine a partition flag of the first subimage, determine a partition pattern of the first subimage block based on the partition flag of the first subimage block, and decode the first subimage block based on the partition pattern of the first subimage block  164

Parse the data stream to determine a partition flag of the second subimage block, determine a partition pattern of the second subimage block based on the partition flag of the second subimage block, and decode the second subimage block based on the partition pattern of the second subimage block, where the partition pattern of the second subimage block is constrained by the partition pattern of the first subimage block, so that an image block partition pattern presented for the partitioned second subimage block and the partitioned first subimage block is different from an image block partition pattern obtained after the 2N×2N image block is partitioned by using the quadtree pattern  — 166

FIG. 16

ENCODING METHOD AND APPARATUS AND DECODING METHOD AND APPARATUS

CROSS-REFERENCE TO RELATED APPLICATIONS

This application is a continuation of International Application No. PCT/CN2017/090063, filed on Jun. 26, 2017, which claims priority to Chinese Patent Application No. 201610512291.1, filed on Jun. 30, 2016. The disclosures of the aforementioned applications are hereby incorporated by reference in their entireties.

TECHNICAL FIELD

The present invention relates to the field of video encoding, decoding, and compression, and in particular, to a technology for partitioning a plurality of encoded image blocks in encoding and decoding processes.

BACKGROUND

Digital video capabilities can be incorporated into a wide range of apparatuses, including a digital television, a digital live broadcast system, a wireless broadcasting system, a personal digital assistant (PDA), a laptop or desktop computer, a tablet computer, an e-book reader, a digital camera, a digital recording apparatus, a digital media player, a video game apparatus, a video game console, a cellular or satellite radio telephone, a video conference apparatus, a video streaming apparatus, and the like. The digital video apparatus implements video compression technologies, for example, video compression technologies described in standards defined in the MPEG-2, MPEG-4, ITU-T H.263, ITU-T H.264/MPEG-4 Part 10 Advanced Video Coding (AVC), and ITU-T H.265/High Efficiency Video Coding (HEVC) standards and extension parts of the standards, thereby transmitting and receiving digital video information more efficiently. The video apparatus may implement the video encoding and decoding technologies to transmit, receive, encode, decode, and/or store digital video information more efficiently.

In the video encoding and decoding field, a frame is a complete image, and a plurality of frames of images can be played after forming a video format according to a specified order and frame rate. After the frame rate reaches a specified value, when an interval between two frames is less than a resolution limit of human eyes, short-time visual stay occurs. In this case, the frames of images can be displayed on a screen seemingly dynamically. A video file can be compressed based on compression coding of a single-frame digital image. A large amount of repetitive representation information exists in a digitized image, and is referred to as redundant information. A frame of image usually includes many parts with a same or similar spatial structure. For example, there is usually a close correlation and similarity between colors of sampling points in a same object or background. In a multi-frame image group, there is basically a strong correlation between a frame of image and a previous frame of image or a next frame of image of the frame of image. There is a slight difference between pixel values for information description, and the pixel values all can be compressed. Similarly, a video file includes not only spatial redundant information but also a large amount of time redundant information, and this is caused by a composition structure of a video. For example, a frame rate for video sampling usually ranges from 25 frames/second to 30 frames/second, and in a special case, may be 60 frames/second. That is, a sampling time interval between two adjacent frames is at least 1/30 second to 1/25 second. Within such a short time, there is basically a large amount of similar information in image frames obtained through sampling, and there is a strong correlation between the frames. However, the frames are separately recorded in an original digital video recording system, and these coherent similar characteristics are not considered or used. This causes a rather huge amount of repeated redundant data. In addition, researches have shown that, from a perspective of a psychological characteristic, to be specific, visual sensitivity of human eyes, video information includes a part that can be compressed, that is, a visual redundancy. The visual redundancy means that appropriate video bitstream compression is performed by using a physiological feature that the human eyes are relatively sensitive to a luminance change but relatively insensitive to a chrominance change. In a high-brightness region, sensitivity of human eye vision to a luminance change presents a downtrend. However, a human eye is relatively sensitive to an edge of an object, and is relatively insensitive to an internal region; and is relatively sensitive to an overall structure, and is relatively insensitive to an internal-detail change. Because ultimate served objects of video image information are a human group, these features of human eyes can be fully used to compress on the original video image information, so as to achieve a better compression effect. In addition to the foregoing spatial redundancy, time redundancy, and vision redundancy, the video image information further includes a series of redundant information such as an information entropy redundancy, a structural redundancy, a knowledge redundancy, and an importance redundancy. An objective of video compression coding is to remove redundant information from a video sequence by using various technical methods, so as to save storage space and transmission bandwidth.

Regarding a current technology development status, video compression processing technologies mainly include intra-prediction, inter-prediction, transform and quantization, entropy encoding, and deblocking filtering processing. Within the international scope, there are four mainstream compression coding schemes in existing video compression coding standards: chrominance sampling, predictive coding, transform coding, and quantization coding.

Chrominance sampling: In this manner, visual psychological characteristics of human eyes are fully used, and an amount of data used for description of a single element attempts to be minimized starting from underlying data representation. Most television systems use luminance-chrominance-chrominance (YUV) color coding that is a standard widely used in European television systems. YUV color space includes one luminance signal Y and two color difference signals U and V, and the three components are independent of each other. The YUV color mode is more flexible due to a representation manner in which the three components are separate from each other, occupies low bandwidth during transmission, and is advantageous over a conventional red, green, and blue (RGB) color model. For example, YUV 4:2:0 indicates that the two chrominance components U and V are both only a half of the luminance Y in both a horizontal direction and a vertical direction; that is, for four sampling pixels, there are four luminance components Y, only one chrominance component U, and only one chrominance component V. In this way, a data amount is further decreased to only approximately 33% of an original data amount. Compressing a video by using physiological and visual features of the human eyes and such chrominance sampling manner is one of video data compression manners used widely currently.

Predictive coding: To be specific, a frame to be encoded currently is predicted by using data information of a previously encoded frame. A predicted value is obtained through prediction, and is not absolutely the same as an actual value. There is a residual value between the predicted value and the actual value. If prediction is more appropriate, a predicted value is closer to an actual value and a residual value is smaller. In this case, a data amount can be greatly reduced by encoding the residual value. During decoding on a decoder side, an initial image is restored and rebuilt by using the residual value plus the predicted value. This is a basic idea of predictive coding. In a mainstream coding standard, predictive coding is classified into two basic types: intra-prediction and inter-prediction.

Transform coding: This means changing an information sampling value from a current domain to another manually defined domain (which is usually referred to as a transform domain) according to a transform function in a form, and then performing compression coding based on a distribution feature of information in the transform domain, instead of directly encoding original spatial domain information. A cause of transform coding is: Video image data usually has a great data correlation in a spatial domain, leading to a large amount of redundant information; and direct coding requires a very large quantity of bits. However, a data correlation in the transform domain is greatly reduced; to-be-encoded redundant information is reduced, and a data amount required for encoding is also greatly reduced correspondingly. In this way, a relatively high compression ratio can be obtained, and a relatively good compression effect can be achieved. Typical transform coding includes Karhunen-Loeve (K-L) transform, Fourier transform, and the like. Integer discrete cosine transform (DCT) is a transform coding scheme commonly used in many international standards.

Quantization coding: The foregoing transform coding itself is actually not used for compressing data, a quantization process is a powerful means to compress data, and is also a main cause of a data "loss" in lossy compression. The quantization process is a process of forcibly approximating an input value in a larger dynamic range to an output value in a smaller dynamic range. The quantized input value has a larger range, and therefore needs to be expressed by using more bits. However, the "forcibly approximated" output value has a smaller range, and therefore can be expressed by using a small quantity of bits. Each quantized input is normalized to a quantized output, that is, is quantized to an order of magnitude. These orders of magnitude are usually referred to as quantization levels (which are usually specified by an encoder).

The foregoing compression coding scheme is used in a coding algorithm based on a hybrid coding architecture, and an encoder control module selects, based on local features of different image blocks in a video frame, a coding scheme used for the image blocks. Frequency domain or spatial domain prediction is performed on a block that is to be encoded through intra-prediction, motion compensation prediction is performed on a block that is to be encoded through inter-prediction, then transform and quantization processing are performed on a predicted residual to form a residual coefficient, and a final data stream is finally generated by an entropy encoder. To avoid prediction error accumulation, an intra-frame or inter-prediction reference signal is obtained by using a decoding module on an encoder side. Inverse quantization and inverse transform are performed on the residual coefficient obtained through transform and quantization, to rebuild a residual signal, and then a rebuilt image is obtained by adding the residual signal to a prediction reference signal. During loop filtering, pixel correction is performed on the rebuilt image, thereby improving encoding quality of the rebuilt image.

In a process of compressing an image by using the foregoing video compression processing technology, block partition needs to be first performed on a to-be-encoded image, that is, an original image. In H.264/AVC, a size of a coding block (Coding block, CB) is fixed, but in H.265/HEVC, a coding tree block (Coding Tree Block, CTB) may be directly used as a CB, or may be further partitioned into a plurality of small CBs in a quadtree form. Therefore, in H.265/HEVC, a CN size is variable, a maximum luminance CB is 64×64, and a minimum luminance CB is 8×8. A large CB can greatly improve encoding efficiency in a flat region; and can well process local details of the image, so that prediction of a complex image is more accurate. As a video becomes a mainstream form of social media, an increasingly high requirement for video compression performance is raised. Therefore, a more flexible and efficient image partition pattern needs to be provided to meet this requirement.

SUMMARY

The present invention provides an encoding method and apparatus and a decoding method and apparatus, to reduce a redundancy and improve encoding and decoding efficiency by using a quadtree-plus-binary-tree partition pattern.

According to a first aspect of the present invention, an encoding method is provided, where the encoding method includes: when partitioning an image block with a size of 2N×2N by using a quadtree partition pattern is allowed, processing a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and the constraint subimage processing mode includes: determining whether the first subimage block needs to be further partitioned; and when the first subimage block does not need to be further partitioned, encoding the first subimage block to generate an encoded data stream; or when the first subimage block needs to be further partitioned, determining a partition pattern of the first subimage block, partitioning the first subimage block based on the partition pattern of the first subimage block, and encoding the partition pattern of the first subimage block and the partitioned first subimage block; and determining whether the second subimage block needs to be further partitioned; and when the second subimage block does not need to be further partitioned, encoding the second subimage block to generate an encoded data stream; or when the second subimage block needs to be further partitioned, determining a partition pattern of the second subimage block, partitioning the second subimage block based on the partition pattern of the second subimage block, and encoding the image partition pattern of the second image block and the partitioned second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

It should be noted that in the foregoing method, a feature "the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern" may also be described as "the partition pattern of the second subimage block is constrained by the partition pattern of the first subimage block, so that a size of a subimage block obtained after at least one of the first subimage block or the second subimage block is partitioned is non N×N". That is, a constraint on a subimage partition pattern causes a difference between a size of a subimage block obtained through binary tree partition and a size of a subimage block obtained through quadtree partition, thereby eliminating a redundancy.

In the present invention, constraint processing is performed on the 2N×N first subimage block and the 2N×N second subimage block and/or the N×2N first subimage and the N×2N second subimage block in the introduced constraint subimage processing mode, thereby reducing a redundancy existing in a quadtree-plus-binary-tree partition process.

According to an implementation of the encoding method provided in the first aspect of the present invention, in the constraint subimage processing mode, the partition pattern of the first subimage block is from a first partition pattern set, and the partition pattern of the second subimage block is from a second partition pattern set, where the first partition pattern set includes at least one partition pattern different from all partition patterns in the second partition pattern set. For example, the first partition pattern set may include vertical partition and horizontal partition, and the second partition pattern set includes only horizontal partition or only vertical partition, that is, the second partition pattern set is a subset of the first partition pattern set. Specifically, a first partition pattern set for the first subimage block with the size of 2N×N includes a horizontal partition pattern and a vertical partition pattern, and the second partition pattern set includes the horizontal partition pattern; and a first partition pattern set for the first subimage block with the size of N×2N includes a horizontal partition pattern and a vertical partition pattern, and the second partition pattern set includes the vertical partition pattern. This limitation manner can be used to avoid using, in a processing process of the first subimage block and the second subimage block, a partition pattern of partitioning the 2N×2N image block into four subimage blocks with a size of N×N, thereby reducing a redundancy. In addition, in a process of performing decoding processing on a second subimage, read codewords can be reduced because a quantity of partition methods used for the second subimage block is limited.

According to another implementation of the encoding method provided in the first aspect of the present invention, if vertical partition is performed on the 2N×N first subimage block, when only horizontal partition is allowed for partitioning the 2N×N second subimage block, in the encoding method, only performing encoding to determine whether the 2N×N second subimage block is further partitioned may be allowed, with no need to perform encoding to determine a specific partition pattern of the 2N×N second subimage block; and if the 2N×N second subimage block needs to be further partitioned, the partition pattern of the 2N×N second subimage block is horizontal partition by default. In this way, codewords for encoding can be further reduced.

According to another implementation of the encoding method provided in the first aspect of the present invention, if horizontal partition is performed on the N×2N first subimage block, when only vertical partition is allowed for partitioning the N×2N second subimage block, in the encoding method, only performing encoding to determine whether the N×2N second subimage block is further partitioned may be allowed, with no need to perform encoding to determine a specific partition pattern of the N×2N second subimage block; and if the N×2N second subimage block needs to be further partitioned, the partition pattern of N×2N second subimage block is vertical partition by default. In this way, codewords required for encoding can be further reduced.

According to another implementation of the encoding method provided in the first aspect of the present invention, when the first subimage block and the second subimage block have a size of 2N×N and the partition pattern of the first subimage block is a vertical partition pattern, the partition pattern of the second subimage block is horizontal partition; or when the first subimage block and the second subimage block have a size of 2N×N and the partition pattern of the first subimage block is a non-vertical partition pattern, the partition pattern of the second subimage block is vertical partition or horizontal partition; or when the first subimage block and the second subimage block have a size of N×2N and the partition pattern of the first subimage block is horizontal partition, the partition pattern of the second subimage block is vertical partition; or when the first subimage block and the second subimage block have a size of N×2N and the partition pattern of the first subimage block is non-horizontal partition, the partition pattern of the second subimage block is horizontal partition or vertical partition. In this manner, flexibility of a binary tree partition pattern can be fully used to improve encoding efficiency.

According to another implementation of the encoding method provided in the first aspect of the present invention, when quadtree partition is allowed, the constraint subimage processing mode is available only for a subimage block obtained by using a particular partition pattern, to be specific, is used only to process the subimage block obtained by using the particular partition pattern. For example, the constraint subimage processing mode is available for, that is, applicable to, a subimage block with the size of N×2N; but is unavailable for, that is, inapplicable to, a subimage block with the size of 2N×N. In this way, flexibility of a processing process can be improved.

According to another implementation of the encoding method provided in the first aspect of the present invention, the encoding method may further include: when partitioning an image block with a size of 2N×2N by using a quadtree partition pattern is not allowed, processing a 2N×N first subimage block and a 2N×N second subimage block or an N×2N first subimage block and an N×2N second subimage block in a non-constraint subimage processing mode, where the 2N×N first subimage block and the 2N×N second subimage block or the N×2N first subimage block and the N×2N second subimage block are obtained by partitioning the image block with the size of 2N×2N. The non-constraint subimage processing mode includes: determining whether the first subimage block needs to be further partitioned; and when the first subimage block does not need to be further partitioned, encoding the first subimage block to generate an encoded data stream; or when the first subimage block needs to be further partitioned, determining a partition pattern of the first subimage block, partitioning the first subimage block based on the partition pattern of the first subimage block, and encoding the partition pattern of the first subimage block and the partitioned first subimage block, where the partition pattern of the first subimage block is from a first partition pattern set. The non-constraint subimage processing mode further includes: determining whether the second subimage block needs to be further partitioned; and when the second subimage block does not need to be further partitioned, encoding the second subimage block to generate an encoded data stream, or when the second subimage block needs to be further partitioned, determining a partition pattern of the second subimage block, partitioning the second subimage block based on the partition pattern of the second subimage block, and encoding the partition pattern of the second subimage block and the partitioned second subimage block, where the partition pattern of the second subimage block is from a second partition pattern set, and all partition patterns in the first partition pattern set are the same as all partition patterns in the second partition pattern set.

In this processing manner, the following can be ensured: When the quadtree partition pattern cannot be used, for example, according to an existing rule, when a quadtree leaf node is partitioned by using a binary tree, leaf nodes obtained through binary tree partition cannot be partitioned by using a quadtree, and using a non-constraint subimage processing mode to obtain subimage blocks with a size of N×N is allowed. This can ensure that a gain brought in a quadtree partition pattern can be fully used for an image.

According to another implementation of the encoding method provided in the first aspect of the present invention, the constraint subimage processing mode is used to encode an I slice (slice). This can ensure a maximum gain.

According to a second aspect of the present invention, a decoding method is provided, including:

parsing a data stream, and when partitioning an image block with a size of 2N×2N by using a quadtree partition pattern is allowed, processing a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and the constraint subimage processing mode includes:

determining whether the first subimage block needs to be further partitioned; and when the first subimage block does not need to be further partitioned, decoding an encoded data stream of the first subimage block; or when the first subimage block needs to be further partitioned, parsing the data stream to obtain a partition pattern of the first subimage block, and decoding the first subimage block based on the obtained partition pattern of the first subimage block; and determining whether the second subimage block needs to be further partitioned; and when the second subimage block does not need to be further partitioned, decoding an encoded data stream of the second subimage block; or when the second subimage block needs to be further partitioned, parsing the data stream to obtain a partition pattern of the second subimage block, and decoding the second subimage block based on the obtained partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

It should be noted that in the foregoing method, a feature "the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern" may also be described as "the partition pattern of the second subimage block is constrained by the partition pattern of the first subimage block, so that a size of a subimage block obtained after at least one of the first subimage block or the second subimage block is partitioned is non N×N". That is, a constraint on a subimage partition pattern causes a difference between a size of a subimage block obtained through binary tree partition and a size of a subimage block obtained through quadtree partition, thereby eliminating a redundancy.

In the present invention, constraint processing is performed on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

According to an implementation of the decoding method provided in the second aspect of the present invention, in the constraint subimage processing mode, the partition pattern of the first subimage block is from a first partition pattern set, and the partition pattern of the second subimage block is from a second partition pattern set, where the first partition pattern set includes at least one partition pattern different from all partition patterns in the second partition pattern set. For example, the first partition pattern set may include vertical partition and horizontal partition, and the second partition pattern set includes only horizontal partition or only vertical partition, that is, the second partition pattern set is a subset of the first partition pattern set. Specifically, a first partition pattern set for the first subimage block with the size of 2N×N includes a horizontal partition pattern and a vertical partition pattern, and the second partition pattern set includes the horizontal partition pattern; and a first partition pattern set for the first subimage block with the size of N×2N includes a horizontal partition pattern and a vertical partition pattern, and the second partition pattern set includes the vertical partition pattern. This limitation manner can be used to avoid using, in a processing process of the first subimage block and the second subimage block, a partition pattern of partitioning the 2N×2N image block into four subimage blocks with a size of N×N, thereby reducing a redundancy. In addition, in a process of performing decoding processing on a second subimage, read codewords can be reduced because a quantity of partition methods used for the second subimage block is limited.

According to another implementation of the decoding method provided in the second aspect of the present invention, if vertical partition is performed on the 2N×N first subimage block, when only horizontal partition is allowed for the 2N×N second subimage block, in the decoding method, only performing decoding to determine whether the 2N×N second subimage block is further partitioned may be allowed, with no need to perform decoding to determine a specific partition pattern of the 2N×N second subimage block; and if the 2N×N second subimage block needs to be further partitioned, the partition pattern of the 2N×N second subimage block is horizontal partition by default. In this way, codewords that need to be read in a decoding process can be further reduced, thereby improving decoding efficiency.

According to another implementation of the decoding method provided in the second aspect of the present invention, if horizontal partition is performed on the N×2N first subimage block, when only vertical partition is allowed for the N×2N second subimage block, in the decoding method, only performing decoding to determine whether the N×2N second subimage block is further partitioned may be allowed, with no need to perform decoding to determine a specific partition pattern of the N×2N second subimage block; and if the N×2N second subimage block needs to be further partitioned, the partition pattern of the N×2N second subimage block is vertical partition by default. In this way, codewords that need to be read in a decoding process can be further reduced, thereby improving decoding efficiency.

According to another implementation of the decoding method provided in the second aspect of the present invention, when the first subimage block and the second subimage block have a size of 2N×N and the partition pattern of the first subimage block is a vertical partition pattern, the partition pattern of the second subimage block is horizontal partition; or when the first subimage block and the second subimage block have a size of 2N×N and the partition pattern of the first subimage block is a non-vertical partition pattern, the partition pattern of the second subimage block is vertical partition or horizontal partition; or when the first subimage block and the second subimage block have a size of N×2N and the partition pattern of the first subimage block is horizontal partition, the partition pattern of the second subimage block is vertical partition; or when the first subimage block and the second subimage block have a size of N×2N and the partition pattern of the first subimage block is non-horizontal partition, the partition pattern of the second subimage block is horizontal partition or vertical partition. In this manner, flexibility of a binary tree partition pattern can be fully used to improve encoding efficiency.

According to another implementation of the decoding method provided in the second aspect of the present invention, when quadtree partition is allowed, the constraint subimage processing mode is available only for a subimage block obtained by using a particular partition pattern, to be specific, is used only to process the subimage block obtained by using the particular partition pattern. For example, the constraint subimage processing mode is available for, that is, applicable to, a subimage block with the size of N×2N; but is unavailable for, that is, inapplicable to, a subimage block with the size of 2N×N. In this way, flexibility of a processing process can be improved.

According to another implementation of the decoding method provided in the second aspect of the present invention, when partitioning an image block with a size of 2N×2N by using a quadtree partition pattern is not allowed, a 2N×N first subimage block and a 2N×N second subimage block or an N×2N first subimage block and an N×2N second subimage block are processed in a non-constraint subimage processing mode, where the 2N×N first subimage block and the 2N×N second subimage block or the N×2N first subimage block and the N×2N second subimage block are obtained by partitioning the image block with the size of 2N×2N. The constraint subimage processing mode includes: determining whether the first subimage block needs to be further partitioned; and when the first subimage block does not need to be further partitioned, decoding an encoded data stream of the first subimage block; or when the first subimage block needs to be further partitioned, parsing the data stream to obtain a partition pattern of the first subimage block, and decoding the first subimage block based on the obtained partition pattern of the first subimage block, where the partition pattern of the first subimage block is from a first partition pattern set. The constraint subimage processing mode further includes: determining whether the second subimage block needs to be further partitioned; and when the second subimage block does not need to be further partitioned, decoding an encoded data stream of the second subimage block; or when the second subimage block needs to be further partitioned, parsing the data stream to obtain a partition pattern of the second subimage block, and decoding the second subimage block based on the obtained partition pattern of the second subimage block, where the partition pattern of the second subimage block is from a second partition pattern set, and all partition patterns in the first partition pattern set are the same as all partition patterns in the second partition pattern set.

In this processing manner, the following can be ensured: When the quadtree partition pattern cannot be used, for example, according to an existing rule, when a quadtree leaf node is partitioned by using a binary tree, leaf nodes obtained through binary tree partition cannot be partitioned by using a quadtree, and using a non-constraint subimage processing mode to obtain subimage blocks with a size of N×N is allowed. This can ensure that a gain brought in a quadtree partition pattern can be fully used for an image.

According to another implementation of the decoding method provided in the second aspect of the present invention, the foregoing constraint subimage processing mode is used to decode an I slice (slice).

According to a third aspect of the present invention, an encoding method is provided, including: when partitioning an image block with a size of 2N×2N by using a quadtree partition pattern is allowed, processing a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and constraint subimage processing mode includes:

determining a partition pattern of the first subimage, encoding the partition pattern of the first image block, and encoding the first subimage block based on the partition pattern of the first subimage block; and determining a partition pattern of the second subimage block, encoding the partition pattern of the second image block, and encoding the second subimage block based on the partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

It should be noted that in the foregoing method, a feature "the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern" may also be described as "the partition pattern of the second subimage block is constrained by the partition pattern of the first subimage block, so that a size of a subimage block obtained after at least one of the first subimage block or the second subimage block is partitioned is non N×N". That is, a constraint on a subimage partition pattern causes a difference between a size of a subimage block obtained through binary tree partition and a size of a subimage block obtained through quadtree partition, thereby eliminating a redundancy.

In the encoding method, the subimage block with the size of N×2N or the subimage block with the size of 2N×N is encoded in the constraint subimage processing mode, thereby reducing a redundancy existing when an image is partitioned by using a quadtree plus a binary tree.

The encoding method provided in the third aspect of the present invention has all beneficial effects of the encoding method provided in the first aspect of the present invention, and may require fewer data streams. In addition, unless otherwise specified, the encoding method provided in the third aspect is applicable to all extended implementations of the encoding method provided in the first aspect of the present invention.

In addition, according to an implementation of the encoding method in the third aspect of the present invention, for the 2N×N first subimage block and the 2N×N second subimage block, the first partition pattern set includes no partition, a horizontal partition pattern, and a vertical partition pattern, and the second partition pattern set includes no partition and the horizontal partition pattern; and for the N×2N first subimage block and the N×2N second subimage block, the first partition pattern set includes no partition, a horizontal partition pattern, and a vertical partition pattern, and the second partition pattern set includes no partition and the vertical partition pattern.

According to another implementation of the encoding method in the third aspect of the present invention, that the partition pattern of the second subimage block is constrained by the partition pattern of the first subimage block includes: when the first subimage block and the second subimage block have a size of 2N×N and the partition pattern of the first subimage block is a vertical partition pattern, the partition pattern of the second subimage block is no partition or horizontal partition; or when the first subimage block and the second subimage block have a size of 2N×N and the partition pattern of the first subimage block is a non-vertical partition pattern, the partition pattern of the second subimage block is no partition, vertical partition, or horizontal partition; or when the first subimage block and the second subimage block have a size of N×2N and the partition pattern of the first subimage block is horizontal partition, the partition pattern of the second subimage block is no partition or vertical partition; or when the first subimage block and the second subimage block have a size of N×2N and the partition pattern of the first subimage block is non-horizontal partition, the partition pattern of the second subimage block is no partition, horizontal partition, or vertical partition.

According to a fourth aspect of the present invention, a decoding method is provided, including: parsing a data stream, and when partitioning an image block with a size of 2N×2N by using a quadtree partition pattern is allowed, processing a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and the constraint subimage processing mode includes:

parsing the data stream to determine a partition identifier of the first subimage block, determining a partition pattern of the first subimage block based on the partition identifier of the first subimage block, and decoding the first subimage block based on the partition pattern of the first subimage block; and parsing the data stream to determine a partition identifier of the second subimage block, determining a partition pattern of the second subimage block based on the partition identifier of the second subimage block, and decoding the second subimage block based on the partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

It should be noted that in the foregoing method, a feature "the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern" may also be described as "the partition pattern of the second subimage block is constrained by the partition pattern of the first subimage block, so that a size of a subimage block obtained after at least one of the first subimage block or the second subimage block is partitioned is non N×N". That is, a constraint on a subimage partition pattern causes a difference between a size of a subimage block obtained through binary tree partition and a size of a subimage block obtained through quadtree partition, thereby eliminating a redundancy.

The decoding method provided in the fourth aspect of the present invention has all beneficial effects of the decoding method provided in the second aspect of the present invention, and may require fewer data streams. In addition, the decoding method provided in the fourth aspect of the present invention is applicable to all extended implementations of the decoding method provided in the second aspect of the present invention.

According to an implementation of the decoding method in the fourth aspect of the present invention, for the 2N×N first subimage block and the 2N×N second subimage block, the first partition pattern set includes no partition, a horizontal partition pattern, and a vertical partition pattern, and the second partition pattern set includes no partition and the horizontal partition pattern; and for the N×2N first subimage block and the N×2N second subimage block, the first partition pattern set includes no partition, a horizontal partition pattern, and a vertical partition pattern, and the second partition pattern set includes no partition and the vertical partition pattern.

According to another implementation of the decoding method in the fourth aspect of the present invention, that the partition pattern of the second subimage block is constrained by the partition pattern of the first subimage block includes: when the first subimage block and the second subimage block have a size of 2N×N and the partition pattern of the first subimage block is a vertical partition pattern, the partition pattern of the second subimage block is no partition or horizontal partition; or when the first subimage block and the second subimage block have a size of 2N×N and the partition pattern of the first subimage block is a non-vertical partition pattern, the partition pattern of the second subimage block is no partition, vertical partition, or horizontal partition; or when the first subimage block and the second subimage block have a size of N×2N and the partition pattern of the first subimage block is horizontal partition, the partition pattern of the second subimage block is no partition or vertical partition; or when the first subimage block and the second subimage block have a size of N×2N and the partition pattern of the first subimage block is non-horizontal partition, the partition pattern of the second subimage block is no partition, horizontal partition, or vertical partition.

According to a fifth aspect of the present invention, an encoding apparatus is provided, where the encoding apparatus is corresponding to the encoding method provided in the first aspect of the present invention, is configured to implement all implementations included in the encoding method provided in the first aspect of the present invention, and includes:

a constraint encoding determining module, configured to: when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and a constraint encoding module that is configured to implement the constraint subimage processing mode and that includes:

a first subimage processing module, configured to: determine whether the first subimage block needs to be further partitioned; and when the first subimage block does not need to be further partitioned, encode the first subimage block to generate an encoded data stream; or when the first subimage block needs to be further partitioned, determine a partition pattern of the first subimage block, partition the first subimage block based on the partition pattern of the first subimage block, and encode the partition pattern of the first subimage block and the partitioned first subimage block; and a second subimage processing module, configured to: determine whether the second subimage block needs to be further partitioned; and when the second subimage block does not need to be further partitioned, encode the second subimage block to generate an encoded data stream; or when the second subimage block needs to be further partitioned, determine a partition pattern of the second subimage block, partition the second subimage block based on the partition pattern of the second subimage block, and encode the image partition pattern of the second image block and the partitioned second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

In the present invention, the encoding apparatus performs constraint processing on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

According to a sixth aspect of the present invention, a decoding apparatus is provided, where the decoding apparatus is corresponding to the decoding method provided in the second aspect of the present invention, is configured to implement all implementations included in the decoding method provided in the second aspect of the present invention, and includes:

a constraint decoding determining module, configured to: parse a data stream, and when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and a constraint decoding module that is configured to implement the constraint subimage processing mode and that includes:

a first subimage processing module, configured to: determine whether the first subimage block needs to be further partitioned; and when the first subimage block does not need to be further partitioned, decode an encoded data stream of the first subimage block; or when the first subimage block needs to be further partitioned, parse the data stream to obtain a partition pattern of the first subimage block, and decode the first subimage block based on the obtained partition pattern of the first subimage block; and a second subimage processing module, configured to: determine whether the second subimage block needs to be further partitioned; and when the second subimage block does not need to be further partitioned, decode an encoded data stream of the second subimage block; or when the second subimage block needs to be further partitioned, parse the data stream to obtain a partition pattern of the second subimage block, and decode the second subimage block based on the obtained partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

The decoding apparatus provided in this implementation of the present invention performs constraint processing on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

According to an implementation of the decoding apparatus provided in the sixth aspect of the present invention, the constraint decoding determining module is further configured to: when partitioning the 2N×2N image block by using a quadtree partition pattern is not allowed, process encoded data streams of the first subimage block and the second subimage block in a non-constraint subimage processing mode; and correspondingly, the decoding apparatus further includes: a non-constraint decoding module that is configured to implement the non-constraint subimage processing mode and that includes:

a third subimage processing module, configured to: parse the data stream to determine a partition identifier of the first subimage block, determine a partition pattern of the first subimage block based on the partition identifier of the first subimage block, and decode the first subimage block based on the partition pattern of the first subimage block; and a fourth subimage processing module, configured to: parse the data stream to determine a partition identifier of the second subimage block, determine a partition pattern of the second subimage block based on the partition identifier of the second subimage block, and decode the second subimage block based on the partition pattern of the second subimage block, where the partition pattern of the first subimage block and the partition pattern of the second subimage block are selected from a same partition pattern set.

According to a seventh aspect of the present invention, an encoding apparatus is provided, where the encoding apparatus is corresponding to the encoding method provided in the third aspect of the present invention, is configured to implement all implementations included in the encoding method provided in the third aspect of the present invention, and includes:

a constraint encoding determining module, configured to: when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and a constraint encoding module that is configured to implement the constraint subimage processing mode and that includes:

a first subimage processing module, configured to: determine a partition pattern of the first subimage, encode the partition pattern of the first image block, and encode the first subimage block based on the partition pattern of the first subimage block; and a second subimage processing module, configured to: determine a partition pattern of the second subimage block, encode the partition pattern of the second image block, and encode the second subimage block based on the partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

In the present invention, the encoding apparatus performs constraint processing on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

According to an eighth aspect of the present invention, a decoding apparatus is provided, where the decoding apparatus is corresponding to the decoding method provided in the fourth aspect of the present invention, is configured to implement all implementations included in the decoding method provided in the fourth aspect of the present invention, and includes:

a constraint decoding determining module, configured to: parse a data stream, and when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and a constraint decoding module that is configured to implement the constraint subimage processing mode and that includes:

a first subimage processing module, configured to: parse the data stream to determine a partition identifier of the first subimage block, determine a partition pattern of the first subimage block based on the partition identifier of the first subimage block, and decode the first subimage block based on the partition pattern of the first subimage block; and a second subimage processing module, configured to: parse the data stream to determine a partition identifier of the second subimage block, determine a partition pattern of the second subimage block based on the partition identifier of the second subimage block, and decode the second subimage block based on the partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

The decoding apparatus provided in this implementation of the present invention performs constraint processing on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

According to an implementation of the decoding apparatus provided in the eighth aspect of the present invention, the constraint decoding determining module is further configured to: when partitioning the 2N×2N image block by using a quadtree partition pattern is not allowed, process encoded data streams of the first subimage block and the second subimage block in a non-constraint subimage processing mode; and correspondingly, the decoding apparatus further includes: a non-constraint decoding module that is configured to implement the non-constraint subimage processing mode and that includes:

a third subimage processing module, configured to: parse the data stream to determine a partition identifier of the first subimage block, determine a partition pattern of the first subimage block based on the partition identifier of the first subimage block, and decode the first subimage block based on the partition pattern of the first subimage block; and a fourth subimage processing module, configured to: parse the data stream to determine a partition identifier of the second subimage block, determine a partition pattern of the second subimage block based on the partition identifier of the second subimage block, and decode the second subimage block based on the partition pattern of the second subimage block, where the partition pattern of the first subimage block and the partition pattern of the second subimage block are selected from a same partition pattern set.

According to the encoding method and apparatus and the decoding method and apparatus that are provided in the implementations of the present invention, in a scenario of partitioning an image by using a quadtree plus a binary tree, a redundancy existing in quadtree-plus-binary-tree partition is eliminated by introducing the constraint subimage processing mode, thereby reducing encoding and decoding complexity and improving encoding and decoding efficiency.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 9 is a schematic diagram of partitioning an image block with a size of 2N×2N into subimage blocks with a size of N×N by using a quadtree partition pattern;

FIG. 10 is a schematic diagram of partitioning an image block with a size of 2N×2N into subimage blocks with a size of N×N by using a binary tree partition pattern;

FIG. 15 is a schematic flowchart of an implementation method of an encoding method according to another embodiment of the present invention;

FIG. 16 is a schematic flowchart of an implementation method of a decoding method according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
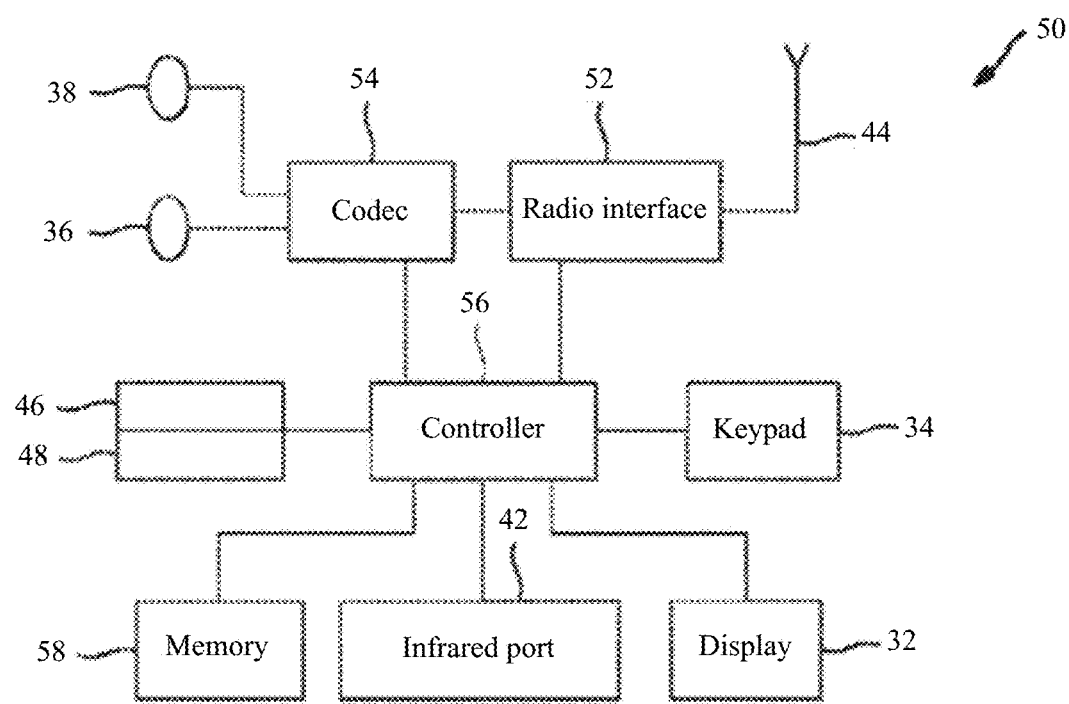
FIG. 1 is a schematic block diagram of a video coding system according to an embodiment of the present invention.
Figure 2:
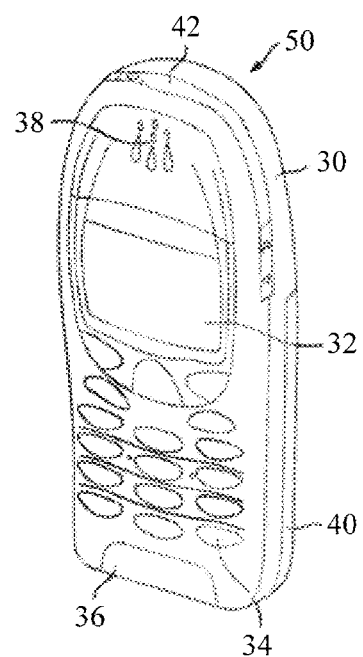
FIG. 2 is a schematic diagram of a video encoding apparatus according to an embodiment of the present invention.

FIG. 1 is a schematic block diagram of a video codec apparatus 50 or an electronic device 50. The apparatus or electronic device may be integrated into a codec in the embodiments of the present invention. FIG. 2 is a schematic diagram of a video encoding apparatus according to an embodiment of the present invention. The following describes units in FIG. 1 and FIG. 2.

The electronic device 50 may be, for example, a mobile terminal or user equipment in a wireless communications system. It should be understood that the embodiments of the present invention may be implemented by any electronic device or apparatus that may need to encode and decode, or encode, or decode a video image.

The apparatus 50 may include a housing 30 that is configured to be integrated into and protect a device. The apparatus 50 may further include a display 32 in a form of a liquid crystal display. In another embodiment of the present invention, the display may be any proper display technology suitable for displaying an image or a video. The apparatus 50 may further include a keypad 34. In another embodiment of the present invention, any proper data or any proper user interface mechanism may be used. For example, a user interface may be implemented as a virtual keyboard, or a data recording system is used as a component of a touch-sensitive display. The apparatus may include a microphone 36 or any proper audio input. The audio input may be a digital or analog signal input. The apparatus 50 may further include an audio output device. In this embodiment of the present invention, the audio output device may be any one of the following devices: an earphone 38, a loudspeaker, or an analog audio or digital audio output connector. The apparatus 50 may further include a battery 40. In another embodiment of the present invention, a device may be powered by any proper mobile energy device, for example, a solar cell, a fuel cell, or a clock mechanism generator. The apparatus may further include an infrared port 42 used for short-range line-of-sight communication with another device. In another embodiment, the apparatus 50 may further include any proper short-range communication solution, for example, a Bluetooth wireless connection or a USB/live-line connection.

The apparatus 50 may include a controller 56 or a processor configured to control the apparatus 50. The controller 56 may be connected to a memory 58. In this embodiment of the present invention, the memory may store data that is in a form of an image and data that is in a form of audio, and/or may store an instruction to be implemented by the controller 56. The controller 56 may be further connected to a codec circuit 54 that is suitable for implementing audio and/or video data encoding and decoding or that is used for encoding and decoding implemented with assist of the controller 56.

The apparatus 50 may further include a card reader 48 and a smart card 46 that are configured to provide user information and are suitable for providing authentication information used to perform authentication and user authorization on a network, for example, a UICC and a UICC reader.

The apparatus 50 may further include a radio interface circuit 52. The radio interface circuit is connected to the controller and is suitable for generating, for example, a wireless communication signal used for communication with a cellular communications network, a wireless communications system, or a wireless local area network. The apparatus 50 may further include an antenna 44. The antenna is connected to the radio interface circuit 52, to send a radio frequency signal generated by the radio interface circuit 52 to other (a plurality of) apparatuses and receive radio frequency signals from the other (the plurality of) apparatuses.

In some embodiments of the present invention, the apparatus 50 includes a camera capable of recording or detecting a single frame, and the codec 54 or the controller receives and processes the single frame. In some embodiments of the present invention, the apparatus receives to-be-processed video image data from another device before performing transmission and/or storage. In some embodiments of the present invention, the apparatus 50 may receive an image through a wireless or wired connection, to perform encoding/decoding.

Figure 3:
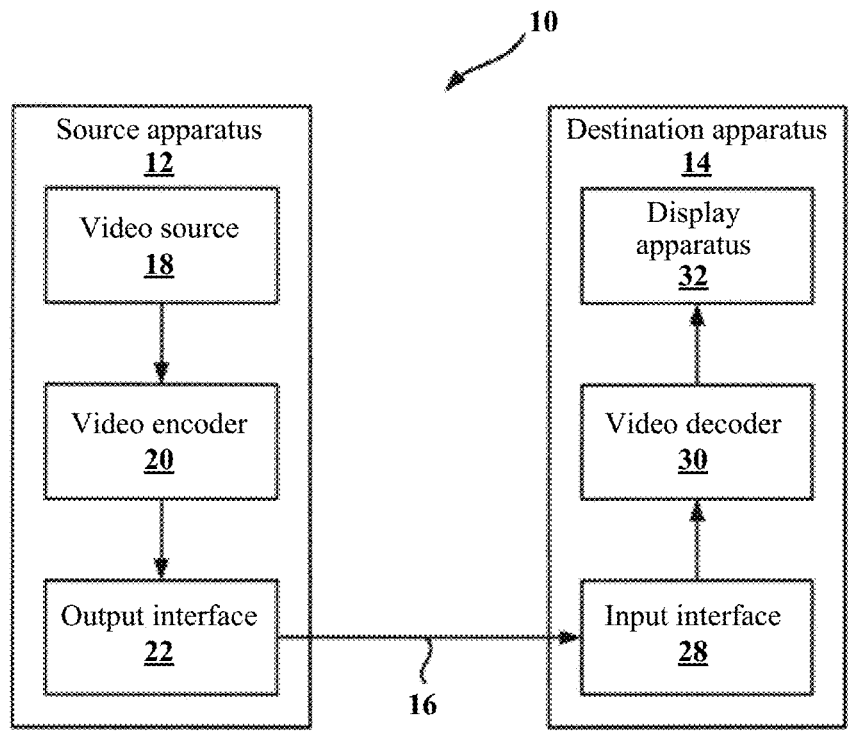
FIG. 3 is a schematic block diagram of another video encoding and decoding system according to an embodiment of the present invention.

FIG. 3 is a schematic block diagram of another video encoding and decoding system 10 according to an embodiment of the present invention. As shown in FIG. 3, the video encoding and decoding system 10 includes a source apparatus 12 and a destination apparatus 14. The source apparatus 12 generates encoded video data. Therefore, the source apparatus 12 may be referred to as a video encoding apparatus or a video encoding device. The destination apparatus 14 may decode the encoded video data generated by the source apparatus 12. Therefore, the destination apparatus 14 may be referred to as a video decoding apparatus or a video decoding device. The source apparatus 12 and the destination apparatus 14 may be examples of video encoding and decoding apparatuses or examples of video encoding and decoding devices. The source apparatus 12 and the destination apparatus 14 may include a broad-sense apparatus including a desktop computer, a mobile computing apparatus, a notebook (for example, laptop) computer, a tablet computer, a set top box, a handheld phone such as a smartphone, a television set, a camera, a display apparatus, a digital media player, a video game console, an in-vehicle computer, or a similar apparatus.

The destination apparatus 14 may receive the encoded video data from the source apparatus 12 by using a channel 16. The channel 16 may include one or more media and/or apparatuses that move the encoded video data from the source apparatus 12 to the destination apparatus 14. In an example, the channel 16 may include one or more communications media that enable the source apparatus 12 to directly transmit the encoded video data to the destination apparatus 14 in real time. In this example, the source apparatus 12 may modulate the encoded video data according to a communications standard (for example, a wireless communications protocol), and may transmit the modulated video data to the destination apparatus 14. The one or more communications media may include a wireless and/or wired communications medium, for example, a radio frequency (RF) spectrum or one or more physical transmission lines. The one or more communications media may form a component of a packet-based network (for example, a local area network, a wide area network, or a global network (for example, the Internet)). The one or more communications media may include a router, a switch, a base station, or other devices that promote communication from the source apparatus 12 to the destination apparatus 14.

In another example, the channel 16 may include a storage medium that stores the encoded video data generated by the source apparatus 12. In this example, the destination apparatus 14 may access the storage medium through disk access or card access. The storage medium may include a plurality of local-access data storage media, for example, a blue-ray disc, a DVD, a CD-ROM, a flash memory, or other proper digital storage media that are configured to store the encoded video data.

In another example, the channel 16 may include a file server or another intermediate storage apparatus that stores the encoded video data generated by the source apparatus 12. In this example, the destination apparatus 14 may access, through streaming transmission or loading, the encoded video data stored in the file server or the another intermediate storage apparatus. The file server may be a type of server that can store the encoded video data and that can transmit the encoded video data to the destination apparatus 14. An example file server includes a web server (for example, used for a website), a File Transfer Protocol (FTP) server, a network attached storage (NAS) apparatus, and a local disk drive.

The destination apparatus 14 may access the encoded video data through a standard-data connection (for example, an Internet connection). An example type of a data connection includes a wireless channel (for example, a Wi-Fi connection), a wired connection (for example, a DSL or a cable modem) suitable for accessing the encoded video data stored on the file server, or a combination thereof. Transmission of the encoded video data from the file server may be streaming transmission, download transmission, or a combination thereof.

A technology of the present invention is not limited to a wireless application scenario. For example, the technology may be applied to video encoding and decoding that supports a plurality of types of multimedia applications such as the following applications: over-the-air television broadcasting, cable television transmission, satellite television transmission, streaming video transmission (for example, through Internet), encoding of the video data stored on the data storage medium, decoding of the video data stored on the data storage medium, or another application. In some examples, the video encoding and decoding system 10 may be configured to support unidirectional or bidirectional video transmission and support an application such as video streaming transmission, video playback, video broadcasting and/or videotelephony.

In an example in FIG. 3, the source apparatus 12 includes a video source 18, a video encoder 20, and an output interface 22. In some examples, the output interface 22 may include a modulator/demodulator (a modem) and/or a transmitter. The video source 18 may include a video capture apparatus (for example, a video camera), a stored video file including previously captured video data, a video input interface configured to receive video data from a video content provider, and/or a computer graphics system configured to generate video data, or a combination of the foregoing video data sources.

The video encoder 20 may encode the video data from the video source 18. In some examples, the source apparatus 12 directly transmits the encoded video data to the destination apparatus 14 by using the output interface 22. The encoded video data may be further stored on the storage medium or the file server, for later access by the destination apparatus 14 to perform decoding and/or playback.

In the example in FIG. 3, the destination apparatus 14 includes an input interface 28, a video decoder 30, and a display apparatus 32. In some examples, the input interface 28 includes a receiver and/or a modem. The input interface 28 may receive the encoded video data by using the channel 16. The display apparatus 32 may be integrated with the destination apparatus 14 or may be outside the destination apparatus 14. The display apparatus 32 usually displays decoded video data. The display apparatus 32 may include a plurality of types of display apparatuses, for example, a liquid crystal display (LCD), a plasma display, an organic light-emitting diode (OLED) display, and other known display apparatuses.

The video encoder 20 and the video decoder 30 may perform operations according to a video compression standard (for example, the High Efficiency Video Coding H.265 standard), and can conform to the HEVC Test Model (HM). The text description ITU-T H.265 (V3) (04/2015) of the H.265 standard was released on Apr. 29, 2015 and can be downloaded from http://handle.itu.int/11.1002/1000/12455. Full content of the file is incorporated in this specification by reference.

Alternatively, the video encoder 20 and video decoder 30 can perform operations according to other proprietary or industry standards, and the standards include ITU-T H.261, ISO/IECMPEG-1 Visual, ITU-T H.262 or ISO/IECMPEG-2 Visual, ITU-T H.263, ISO/IECMPEG-4 Visual, ITU-T H.264 (also referred to as ISO/IECMPEG-4 AVC), and include scalable video coding (SVC) extension and multiview video coding (MVC) extension. It should be understood that the technology of the present invention is not limited to any particular encoding or decoding standard or technology.

In addition, FIG. 3 is merely an example, and the technology of the present invention is applicable to a video encoding/decoding application (for example, one-sided video encoding or video decoding) that does not necessarily include any data communication between an encoding apparatus and a decoding apparatus. In another example, data is retrieved from a local memory, and the data is transmitted in a streaming manner through a network, or the data is operated in a similar manner. The encoding apparatus can encode data and store the data into a memory, and/or the decoding apparatus can retrieve data from a memory and decode the data. In many examples, encoding and decoding are performed by a plurality of apparatuses that do not perform mutual communication but only encode data and store the encoded data to a memory, and/or retrieve data from the memory and decode the data.

The video encoder 20 and the video decoder 30 each may be implemented as any one of a plurality of proper circuits, such as one or more microprocessors, a digital signal processor (DSP), an application-specific integrated circuit (ASIC), a field programmable gate array (FPGA), discrete logic, hardware, or any combination thereof. If the technology is partially or completely implemented by using software, the apparatus may store software instructions in a proper non-instantaneous computer-readable storage medium, and may execute instructions in hardware by using one or more processors, to execute the technology of the present invention. Any one of the foregoing (including hardware, software, a combination of hardware and software, and the like) may be considered as one or more processors. Each of the video encoder 20 and the video decoder 30 may be included in one or more encoders or decoders. Any one of the video encoder 20 and the video decoder 30 may be integrated as a component of a combined encoder/decoder (codec (CODEC)) of another apparatus.

The present invention may substantially refer to that the video encoder 20 "sends, by using a signal", a piece of information to another apparatus (for example, the video decoder 30). The term "sends, by using a signal" may substantially refer to transfer of a syntax element and/or encoded video data. The transfer may occur in real time or approximately in real time. Alternatively, the communication may occur based on a time span, for example, when a syntax element is stored into a computer readable storage medium during encoding by using binary data obtained through encoding. After being stored into this medium, the syntax element may be searched for by the decoding apparatus at any time.

The video encoder 20 encodes video data. The video data may include one or more pictures. The video encoder 20 may generate a data stream. The data stream includes encoding information of video data in a form of a bitstream. The encoding information may include encoded picture data and related data. The related data may include a sequence parameter set (SPS), a picture parameter set (PPS), and another syntax structure. The SPS may include a parameter applied to zero or a plurality of sequences. The PPS may include a parameter applied to zero or a plurality of pictures. The syntax structure is a set of zero or a plurality of syntax elements arranged in the data stream in a specified order.

To generate encoding information of a picture, the video encoder 20 may partition the picture into grids in a form of a coding tree block (CTB). In some examples, a CTB may be referred to as a "tree block", a "largest coding unit" (LCU), or a "coding tree unit". The CTB is not limited to a particular size, and may include one or more coding units (CU). Each CTB may be associated with pixel blocks of an equal size in the picture. Each pixel in a pixel block may be corresponding to one luminance (luminance or luma) sample and two chrominance (chrominance or chroma) samples. Therefore, each CTB may be associated with one luminance sampling block and two chrominance sampling blocks. A CTB of a picture may be partitioned into one or more slices. In some examples, each slice includes an integer quantity of CTBs. During picture encoding, the video encoder 20 may generate encoding information of each slice of the picture, that is, encode a CTB within the slice. To encode the CTB, the video encoder 20 recursively performs quadtree partition on the pixel block associated with the CTB, to partition the pixel block into pixel blocks with decreasing sizes. The smaller pixel blocks may be associated with the CU.

Figure 4:
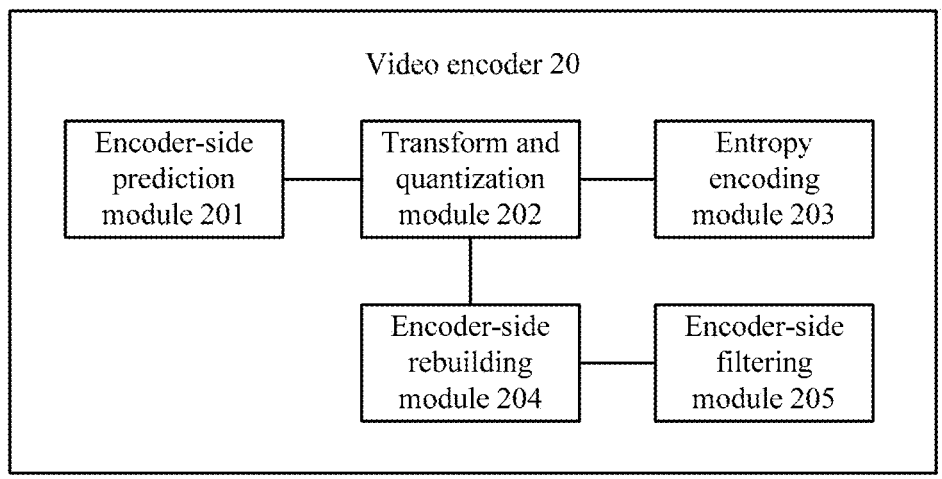
FIG. 4 is a schematic block diagram of a video encoder according to an embodiment of the present invention.
Figure 5:
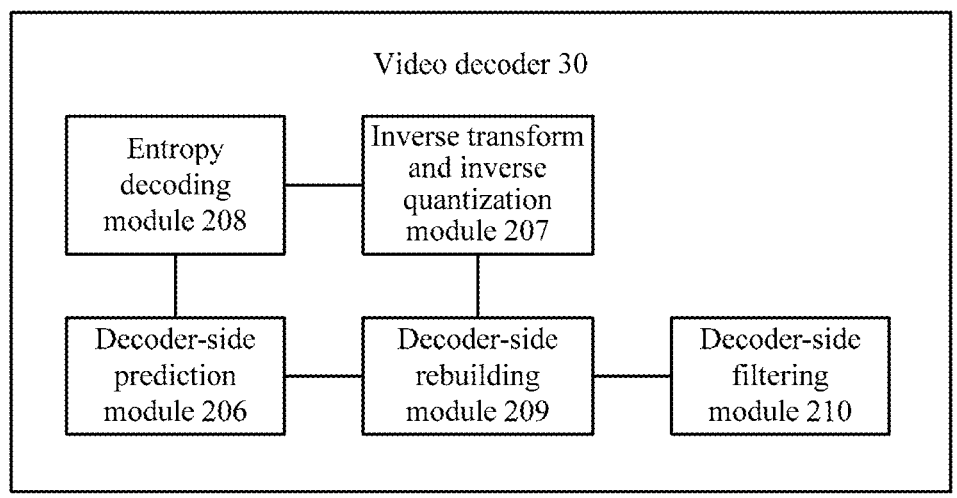
FIG. 5 is a schematic block diagram of a video decoder according to an embodiment of the present invention.

FIG. 4 is a schematic block diagram of a video encoder 20 according to an embodiment of the present invention. The video encoder 20 includes an encoder-side prediction module 201, a transform and quantization module 202, an entropy encoding module 203, an encoder-side rebuilding module 204, and an encoder-side filter module 205. FIG. 5 is a schematic block diagram of a video decoder 30 according to an embodiment of the present invention. The video decoder 30 includes a decoder-side prediction module 206, an inverse transform and inverse quantization module 207, an entropy decoding module 208, a decoder-side rebuilding module 209, and a decoder-side filter module 210. Details are as follows.

The encoder-side prediction module 201 and the decoder-side prediction module 206 are configured to generate predictive data. The video encoder 20 may generate one or more prediction units (PU) for each CU that is no longer partitioned. Each PU of a CU may be associated with a pixel block, different from the PU, within a pixel block of the CU. The video encoder 20 may generate a predictive pixel block in terms of each PU of the CU. The video encoder 20 may generate the predictive pixel block for the PU through intra-prediction or inter-prediction. If the video encoder 20 generates the predictive pixel block for the PU through intra-prediction, the video encoder 20 may generate the predictive pixel block for the PU based on a pixel obtained after a picture associated with the PU is decoded. If the video encoder 20 generates the predictive pixel block for the PU through inter-prediction, the video encoder 20 may generate the predictive pixel block for the PU based on a pixel obtained after one or more pictures different from a picture associated with the PU are decoded. The video encoder 20 may generate a residual pixel block of the CU based on the predictive pixel block for the PU of the CU. The residual pixel block of the CU may indicate a difference between a sampling value in the predictive pixel block for the PU of the CU and a corresponding sampling value in an initial pixel block of the CU.

The transform and quantization module 202 is configured to process predicted residual data. The video encoder 20 may perform recursive quadtree partition on the residual pixel block of the CU, to partition the residual pixel block of the CU into one or more smaller residual pixel blocks associated with a transform unit (TU) of the CU. Each pixel in a pixel block associated with a TU is corresponding to one luminance sample and two chrominance samples; therefore, each TU may be associated with one luminance residual sampling block and two chrominance residual sampling blocks. The video encoder 20 may perform one or more transformations on a residual sampling block associated with the TU, so as to generate a coefficient block (namely, a block of coefficients). The transformation may be DCT transform or a variant thereof. Using a DCT transform matrix, a two-dimensional transformation is calculated by using a one-dimensional transformation in horizontal and vertical directions, so as to obtain the coefficient block. The video encoder 20 may execute a quantization program on each coefficient in the coefficient block. Quantization usually means that a coefficient is quantized to reduce a data amount used to represent the coefficient, so as to provide a further compression process. The inverse transform and inverse quantization module 207 performs an inverse process of the transform and quantization module 202.

The video encoder 20 may generate a set of syntax elements that represent coefficients in a quantized coefficient block. The video encoder 20 may perform an entropy encoding operation (for example, a context-adaptive binary arithmetic coding (CABAC) operation) on some or all of the syntax elements by using the entropy encoding module 203. To perform CABAC encoding on the syntax elements, the video encoder 20 may binarize the syntax elements to form a binary sequence including one or more bits (referred to as "binary bits"). The video encoder 20 may encode some of the binary bits through regular (regular) coding, and may encode other of the binary bits through bypass (bypass) coding.

In addition to performing entropy encoding on the syntax elements in the coefficient block, the video encoder 20 may perform inverse quantization and inverse transform on a transformed coefficient block by using the encoder-side rebuilding module 204, to rebuild a residual sampling block from the transformed coefficient block. The video encoder 20 may add the rebuilt residual sampling block to a sampling block corresponding to one or more predictive sampling blocks, to generate a rebuilt sampling block. By rebuilding each color component sampling block, the video encoder 20 may rebuild a pixel block associated with a TU. In this way, rebuilding of a pixel block for each TU of the CU is performed until rebuilding of an entire pixel block of the CU is completed.

After rebuilding the pixel block of the CU, the video encoder 20 performs a deblocking filtering operation by using the encoder-side filter module 205, to reduce a block effect of the pixel block associated with the CU. After performing the deblocking filtering operation, the video encoder 20 may perform sampling adaptive offset (SAO) to modify a rebuilt pixel block of a CTB of a picture. After performing the operations, the video encoder 20 may store the rebuilt pixel block of the CU into a decoded-picture buffer, to generate a predictive pixel block for another CU.

The video decoder 30 may receive a data stream. The data stream includes, in a form of a bitstream, encoding information of video data encoded by the video encoder 20. The video decoder 30 parses the data stream by using the entropy decoding module 208, to extract a syntax element from the data stream. When the video decoder 30 performs CABAC decoding, the video decoder 30 may perform regular decoding on some binary bits and may perform bypass decoding on other binary bits. There is a mapping relationship between the binary bits and the syntax element in the data stream, and the syntax element is obtained by parsing the binary bits.

The video decoder 30 may rebuild, by using the decoder-side rebuilding module 209, a picture of the video data based on the syntax element extracted from the data stream. The process of rebuilding the video data based on the syntax element is substantially inverse to a process of performing an operation by the video encoder 20 to generate a syntax element. For example, the video decoder 30 may generate a predictive pixel block for a PU of a CU based on a syntax element associated with the CU. In addition, the video decoder 30 may reversibly quantize a coefficient block associated with the TU for the CU. The video decoder 30 may perform inverse transform on the inversely quantized coefficient block, to rebuild a residual pixel block associated with the TU for the CU. The video decoder 30 may rebuild a pixel block of the CU based on the predictive pixel block and the residual pixel block.

After rebuilding the pixel block of the CU, the video decoder 30 performs a deblocking filtering operation by using the decoder-side filter module 210, to reduce a block effect of the pixel block associated with the CU. In addition, based on one or more SAO syntax elements, the video decoder 30 may perform a same SAO operation as the video encoder 20. After performing these operations, the video decoder 30 may store a pixel block of the CU into the decoded-picture buffer. The decoded-picture buffer may provide a reference picture used for subsequent motion compensation, intra-prediction, and display-apparatus presentation.

Figure 6:
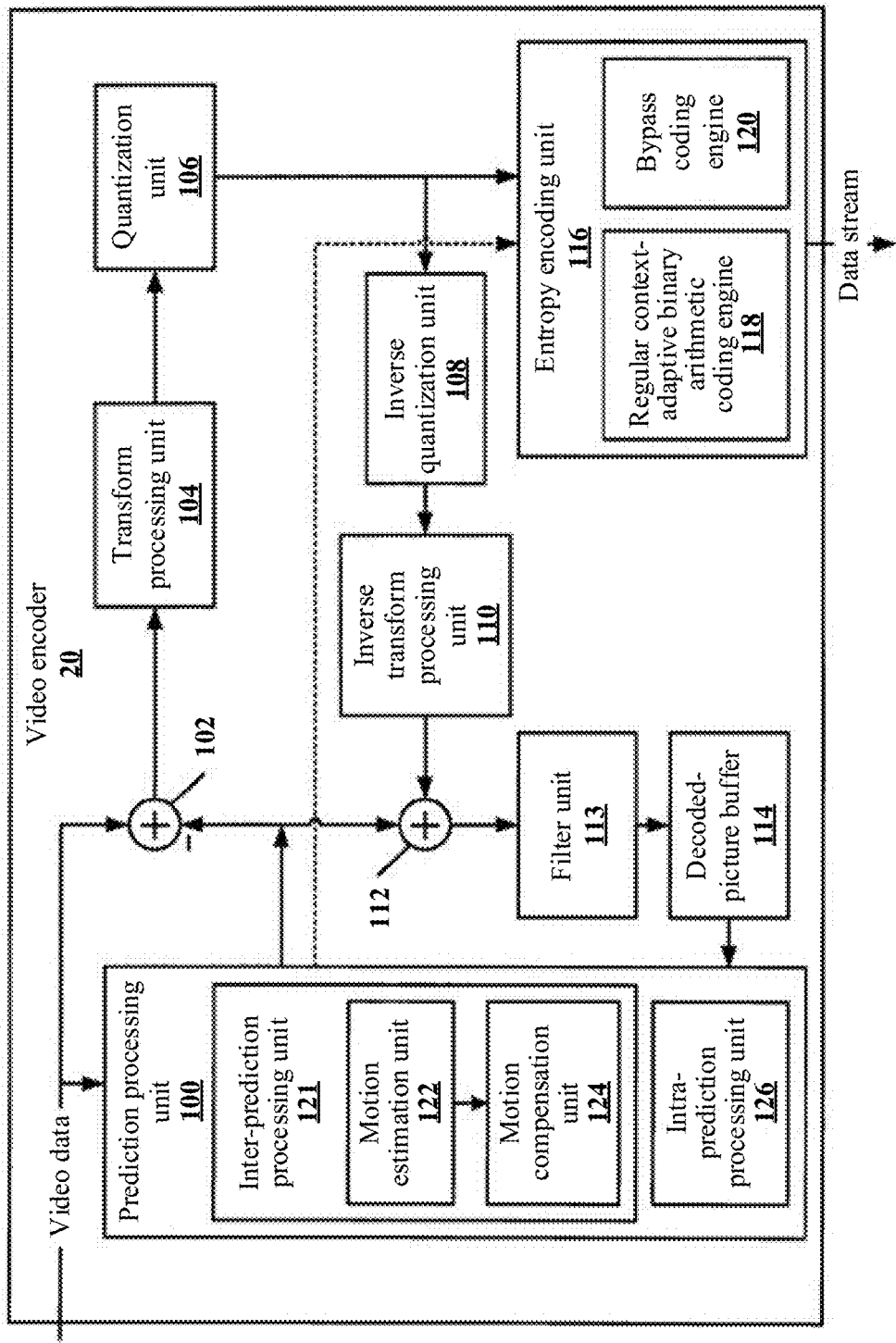
FIG. 6 is a schematic apparatus diagram of a video encoder according to an embodiment of the present invention.

FIG. 6 is a block diagram of an example of a video encoder 20 configured to implement a technology of the present invention. It should be understood that FIG. 6 is an example and should not be construed as a limitation on a technology that is exemplified widely and described by the present invention. As shown in FIG. 6, the video encoder 20 includes a prediction processing unit 100, a residual generation unit 102, a transform processing unit 104, a quantization unit 106, an inverse quantization unit 108, an inverse transform processing unit 110, a rebuilding unit 112, a filter unit 113, a decoded-picture buffer 114, and an entropy encoding unit 116. The entropy encoding unit 116 includes a regular CABAC encoding/decoding engine 118 and a bypass encoding/decoding engine 120. The prediction processing unit 100 includes an inter-prediction processing unit 121 and an intra-prediction processing unit 126. The inter-prediction processing unit 121 includes a motion estimation unit 122 and a motion compensation unit 124. In another example, the video encoder 20 may include more or fewer or different function components.

The video encoder 20 receives video data. To encode the video data, the video encoder 20 may encode each slice of each picture of the video data. During slice encoding, the video encoder 20 may encode each CTB in the slice. During CTB encoding, the prediction processing unit 100 may perform, according to the international video coding standard H.265/HEVC, quadtree partition on a pixel block associated with a CTB, to partition the pixel block into smaller pixel blocks. For example, in intra-prediction, the prediction processing unit 100 may partition a pixel block of the CTB into four sub-blocks with a same size. Recursive quadtree partition may continue to be performed on one or more of the sub-blocks to obtain four sub-blocks with a same size, so as to obtain an image block on which encoding can be performed and that is also referred to as a coding block (CU). In inter-prediction, the prediction processing unit 100 partitions a CU in a CTB into one, two, or four PUs based on eight non-recursive partition patterns.

The video encoder 20 may encode a CU in a CTB of a picture to generate encoding information of the CU. The video encoder 20 may encode the CU of the CTB in a zigzag scanning order. In other words, the video encoder 20 may encode the CU in an order: an upper-left CU, an upper-right CU, a lower-left CU, and a lower-right CU. When the video encoder 20 encodes the CUs obtained through partition, the video encoder 20 may encode, in the zigzag scanning order, CUs associated with sub-blocks of pixel blocks of the CUs obtained through partition.

In addition, the prediction processing unit 100 may partition a pixel block of a CU in one or more PUs of the CU. The video encoder 20 and a video decoder 30 can support PUs with various sizes. Assuming that a size of a particular CU is 2N×2N, in an existing H.265/HEVC video coding standard, the video encoder 20 and the video decoder 30 can support a PU with a size of 2N×2N or N×N to perform intra-prediction; and support a symmetric PU with a size of 2N×2N, 2N×N, N×2N, N×N, or a similar size to perform inter-prediction. The video encoder 20 and the video decoder 30 can further support an asymmetric PU with a size of 2N×nU, 2N×nD, nL×2N, or nR×2N to perform inter-prediction.

However, a main problem with such CTB/CU-partition pattern used in the H.265/HEVC video coding standard lies in that a to-be-encoded image block can be only a square block in intra-prediction, the to-be-encoded image block may be a rectangular block in inter-prediction, but a CU is partitioned into PUs in inter-prediction in a non-recursive manner. Therefore, a shape of an inter-prediction PU is also greatly limited. To improve flexibility of coding block partition of a video, a quadtree-plus-binary-tree (Quadtree Plus Binary Tree, QTBT) partition method emerges.

Figure 7:
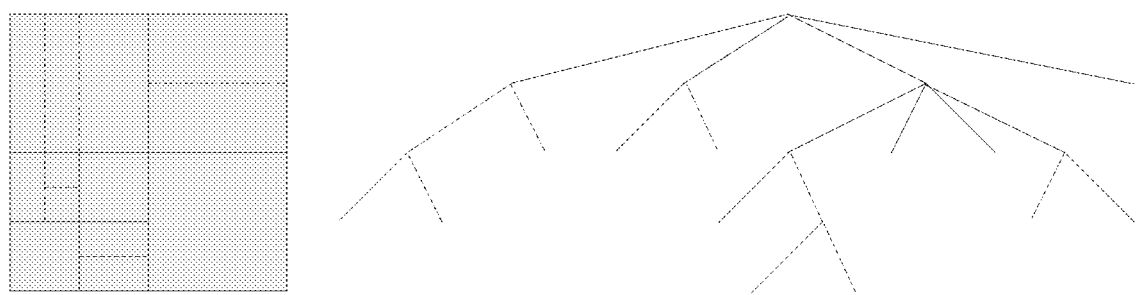
FIG. 7 is a schematic diagram of a quadtree-plus-binary-tree partition structure.

The method is specifically: first performing recursive quadtree partition on an image block (for example, a CTU), and then performing recursive partition on each quadtree leaf node by using a binary tree. During quadtree partition, a quadtree leaf node needs to be not less than minQTSize. During binary tree partition, a root node in binary tree partition needs to be not greater than maxBTSize and not less than minBTSize, and a binary tree partition depth does not need to exceed maxBTDepth. Binary tree partition includes horizontal binary tree partition and vertical binary tree partition, that is, partitioning a current image block into two subimage blocks with equal sizes in a horizontal direction or a vertical direction. A quadtree-plus-binary-tree partition structure is shown in FIG. 7. Assuming that a size of an image block (which may be a CTU or a CTB) is 128×128, MinQTSize is 16×16, MaxBTSize is 64×64, MinBTSize (a width and a height) is 4, and MaxBTDepth is 4. First, quadtree partition is performed on the image block to obtain quadtree leaf nodes. A size of the quadtree leaf node may range from 16×16 (that is, MinQTSize) to 128×128 (that is, the size of the image block). If the size of the quadtree leaf node is 128×128, no binary tree partition is performed on the quadtree leaf node. This is because the size of the quadtree leaf node exceeds MaxBTSize (that is, 64×64). In another case, binary tree partition is further performed on the quadtree leaf node. In this case, the quadtree leaf node is a head node of a binary tree, and a depth of the binary tree is 0. When a depth of the binary tree reaches MaxBTDepth (that is, 4), no further partition is performed. When a width of the binary tree is equal to MinBTSize (that is, 4), no further horizontal partition is performed. Similarly, when a height of the binary tree is equal to MinBTSize (that is, 4), no further vertical partition is performed. As shown in FIG. 7, the left figure shows block partition obtained by using QTBT, and the right figure shows a corresponding tree structure. A solid line represents quadtree partition, and a dotted line represents binary tree partition. A specific method for marking the quadtree-plus-binary-tree partition pattern method in an encoding process may be as follows:

(a) If quadtree partition may be used for a current image block, that is, a block size is not less than minQTSize, and no binary tree partition has been performed before, an identifier A is encoded, where 0 indicates that no quadtree partition is performed; and 1 indicates that quadtree partition is performed.

(b) If binary tree partition may also be used for a current block, that is, a current block size is not less than maxBT-Size and is not greater than maxBTSzie, and a depth of a binary tree does not exceed maxBTDepth, an identifier B is encoded, where 0 indicates that no binary tree partition is performed; non zero indicates that binary tree partition is performed. If the identifier is non zero, it indicates that binary tree partition has been performed. Another value needs to be encoded to indicate horizontal partition or vertical partition. 1 represents horizontal binary tree partition, and 2 represents vertical binary tree partition. For example, for a representation form of the identifier B, 0 indicates that no binary tree partition is performed, 10 indicates that horizontal binary tree partition is performed, and 11 indicates vertical binary tree partition is performed.

Partition performed on the image block through quadtree-plus-binary-tree partition can improve encoding flexibility and encoding efficiency.

The inter-prediction processing unit 121 may perform inter-prediction on each PU of a CU to generate predictive data of the PU. The predictive data of the PU may include a predictive pixel block corresponding to the PU and motion information of the PU. A slice may be an I slice, a P slice, or a B slice. The inter-prediction unit 121 may perform a different operation on the PU of the CU depending on whether the PU is in the I slice, the P slice, or the B slice. In the I slice, intra-prediction is performed on all PUs.

If the PU is in the P slice, the motion estimation unit 122 may search reference pictures in a reference-picture list (for example "list 0") for a reference block for the PU. The reference block for the PU may be a pixel block that is most closely corresponding to a pixel block for the PU. The motion estimation unit 122 may generate a reference image index of a reference picture indicating a reference block including a PU in list 0 and a motion vector indicating spatial displacement between the pixel block and the reference block for the PU. The motion estimation unit 122 may output the reference image index and the motion vector as motion information of the PU. The motion compensation unit 124 may generate the predictive pixel block for the PU based on the reference block indicated by the motion information of the PU.

If the PU is in the B slice, the motion estimation unit 122 may perform unidirectional inter-prediction or bidirectional inter-prediction on the PU. To perform unidirectional inter-prediction on the PU, the motion estimation unit 122 may search reference pictures in a first reference-picture list ("list 0") or a second reference-picture list ("list 1") to find a reference block for the PU. The motion estimation unit 122 may output the following as the motion information: a reference image index indicating a location of a reference picture, including a reference block, in list 0 or list 1, a motion vector indicating spatial displacement between a pixel block for the PU and the reference block, and a predicted-direction indicator indicating whether a reference picture is in list 0 or list 1. To perform bidirectional inter-prediction on the PU, the motion estimation unit 122 may search reference pictures in list 0 to find a reference block for the PU, and may further search reference pictures in list 1 to find another reference block for the PU. The motion estimation unit 122 may generate reference image indexes indicating locations, of a reference picture including the reference block, in list 0 and list 1. In addition, the motion estimation unit 122 may generate a motion vector indicating spatial displacement between the reference block and the pixel block for the PU. The motion information of the PU may include the reference image indexes and the motion vector of the PU. The motion compensation unit 124 may generate the predictive pixel block for the PU based on the reference block indicated by the motion information of the PU.

The intra-prediction processing unit 126 may perform intra-prediction on the PU to generate predictive data of the PU. The predictive data of the PU may include a predictive pixel block and various syntax elements of the PU. The intra-prediction processing unit 126 may perform intra-prediction on the PUs in the I slice, the P slice, or the B slice.

To perform intra-prediction on the PU, the intra-prediction processing unit 126 may generate a plurality of sets of predictive data of the PU in a plurality of intra-prediction mode. To generate a set of predictive data of the PU in an intra-prediction mode, the intra-prediction processing unit 126 may span a sampling block of the PU in a direction associated with the intra-prediction mode, to extend sampling of a sampling block of a neighboring PU. Assuming that a left-to-right and top-down encoding order is used for a PU, a CU, and a CTB, a neighboring PU may be above the PU, on the upper-right part of the PU, on the upper-left part of the PU, or on the left of the PU. The intra-prediction processing unit 126 may use intra-prediction mode sets including different quantities of intra-prediction modes, for example, 33 directional intra-prediction modes. In some examples, a quantity of intra-prediction modes may depend on a size of a pixel block for the PU.

The prediction processing unit 100 may select predictive data of a PU of a CU from predictive data generated for the PU by the inter-prediction processing unit 121 or predictive data generated for the PU by the intra-prediction processing unit 126. In some examples, the prediction processing unit 100 may select the predictive data of the PU of the CU based on a rate/distortion measure of a set of predictive data. For example, a Lagrange cost function is used to perform selection between a coding scheme and a parameter value thereof (for example, a motion vector, a reference index, and an intra-prediction direction). In such a cost function, a weighting factor lambda is used to associate actual or estimated image distortion caused by a lossy coding method and actual or estimated amount of information required for representing a pixel value in an image area: $C=D+\text{lambda}\times R$, where C represents to-be-minimized Lagrange costs, D represents image distortion (for example, a mean square error) in a mode and with a parameter thereof, and R represents a bit quantity (for example, including a data amount used to represent a candidate motion vector) required for rebuilding an image block by a decoder. A coding scheme with lowest costs is usually selected as an actual coding scheme. A predictive pixel block that selects predictive data may be referred to as a selection of a predictive pixel block in this specification.

The residual generation unit 102 may generate a residual pixel block of the CU based on the pixel block of the CU and the selected predictive pixel block for the PU of the CU. For example, the residual generation unit 102 may generate the residual pixel block of the CU, so that each sample of the residual pixel block has a value equal to a difference between the following: a sample of a pixel block for the CU and a corresponding sample in a selected predictive pixel block for the PU of the CU.

The prediction processing unit 100 may perform quadtree partition to partition the residual pixel block of the CU into sub-blocks. Each residual pixel block that is no longer partitioned may be associated with a different TU for the CU. There is no necessary connection between a size and location of the residual pixel block associated with the TU for the CU and a size and location of the pixel block associated with the PU of the CU.

A pixel in a residual pixel block for a TU may be corresponding to one luminance sample and two chrominance samples; therefore, each TU may be associated with one luminance sampling block and two chrominance sampling blocks. The transform processing unit 104 may perform one or more transformations on a residual sampling block associated with the TU, so as to generate a coefficient block of each TU for the CU. For example, the transform processing unit 104 may perform discrete cosine transform (DCT), directional transform, or transform having a similar concept on the residual sampling block.

The quantization unit 106 may quantize a coefficient in the coefficient block. For example, an n-digit coefficient may be truncated to an m-digit coefficient during quantization, where n is greater than m. The quantization unit 106 may quantize, based on a quantization parameter (QP) value associated with the CU, a coefficient block associated with a TU for the CU. The video encoder 20 may adjust the QP value associated with the CU, to adjust a degree of quantization performed on the coefficient block associated with the CU.

The inverse quantization unit 108 and the inverse transform processing unit 110 may respectively perform inverse quantization and inverse transform on a transformed coefficient block to rebuild a residual sampling block from the coefficient block. The rebuilding unit 112 may add a sample of a rebuilt residual sampling block to a corresponding sample of one or more predictive sampling blocks generated by the prediction processing unit 100, to generate a rebuilt sampling block associated with the TU. By rebuilding a sampling block of each TU for the CU in this manner, the video encoder 20 may rebuild a pixel block of the CU.

The filter unit 113 may perform a deblocking filtering operation to reduce a block effect of a pixel block associated with a CU. In addition, the filter unit 113 may perform an operation on the rebuilt sampling block by using an SAO determined by the prediction processing unit 100, to restore a pixel block. The filter unit 113 may generate encoding information of an SAO syntax element of the CTB.

The decoded-picture buffer 114 may store the rebuilt pixel block. The inter-prediction unit 121 may use a reference picture including the rebuilt pixel block to perform inter-prediction on a PU of another picture. In addition, the intra-prediction processing unit 126 may use the rebuilt pixel block in the decoded-picture buffer 114 to perform intra-prediction on another PU in a same picture as the CU.

The entropy encoding unit 116 may receive data from another function component of the video encoder 20. For example, the entropy encoding unit 116 may receive a coefficient block from the quantization unit 106 and may receive a syntax element from the prediction processing unit 100. The entropy encoding unit 116 may perform one or more entropy encoding operations on the data to generate entropy encoded data. For example, the entropy encoding unit 116 may perform a context-based adaptive variable length coding (CAVLC) operation, a CABAC operation, a variable to variable (V2V) length coding operation, a syntax-based context-based adaptive binary arithmetic coding (SBAC) operation, a probability interval partitioning entropy (PIPE) coding operation, or another type of entropy encoding operation. In a particular example, the entropy encoding unit 116 may use the regular CABAC engine 118 to encode a regular CABAC encoded/decoded binary bit of a syntax element, and may use a bypass encoding/decoding engine 120 to encode a bypass encoded/decoded binary bit.

Figure 8:
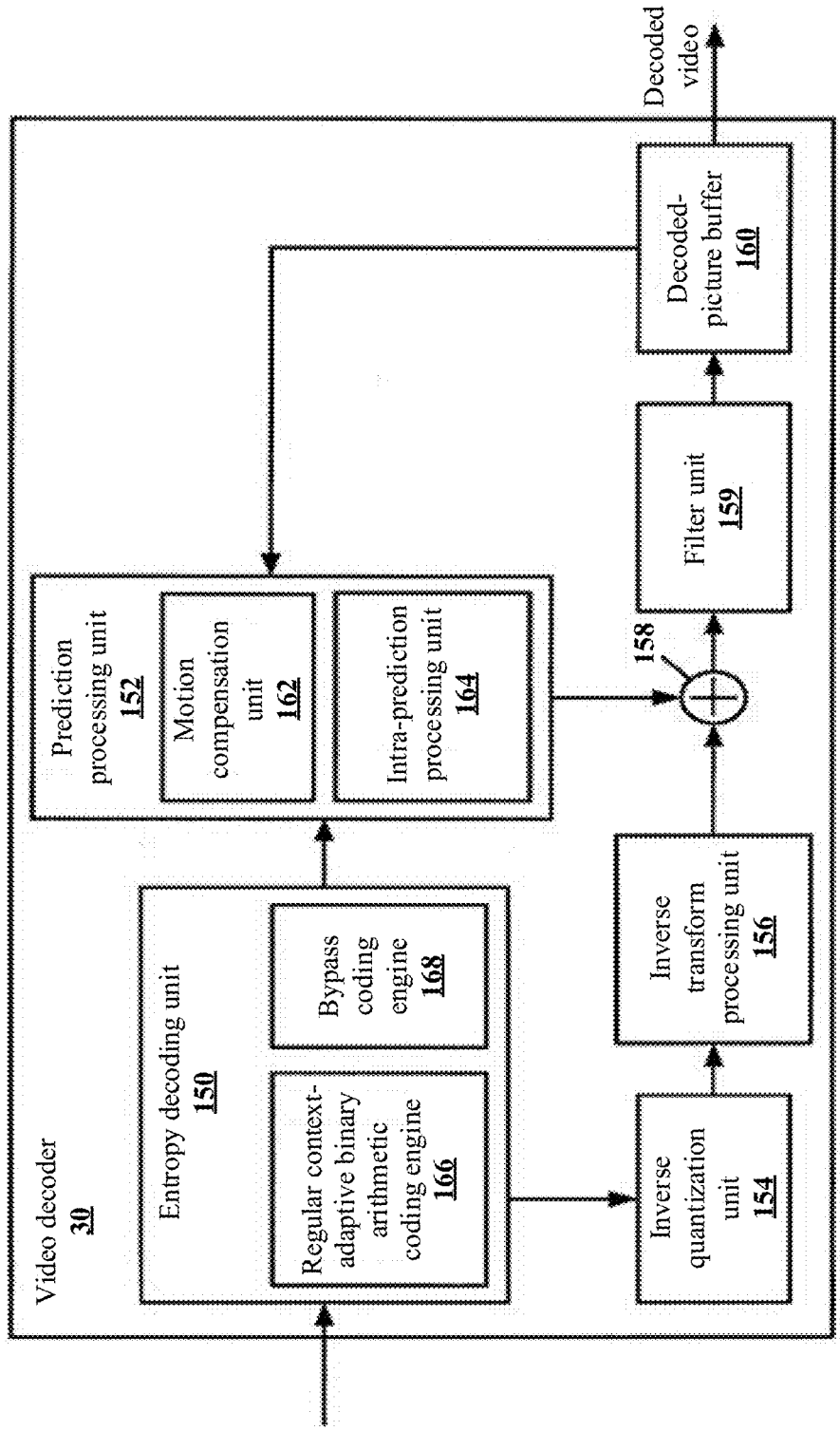
FIG. 8 is a schematic apparatus diagram of a video decoder according to an embodiment of the present invention.

FIG. 8 is a block diagram of an example of a video decoder 30 configured to implement a technology of the present invention. It should be understood that FIG. 8 is an example and should not be construed as a limitation on a technology that is exemplified widely and described by the present invention. As shown in FIG. 8, the video decoder 30 includes an entropy decoding unit 150, a prediction processing unit 152, an inverse quantization unit 154, an inverse transform processing unit 156, a rebuilding unit 158, a filter unit 159, and a decoded-picture buffer 160. The prediction processing unit 152 includes a motion compensation unit 162 and an intra-prediction processing unit 164. The entropy decoding unit 150 includes a regular CABAC encoding/decoding engine 166 and a bypass encoding/decoding engine 168. In another example, the video decoder 30 may include more or fewer or different function components.

The video decoder 30 may receive a data stream. The entropy decoding 150 may parse the data stream to extract a syntax element from the data stream. During data stream decoding, the entropy decoding unit 150 may parse a syntax element that is in the data stream and on which entropy encoding is performed. The prediction processing unit 152, the inverse quantization unit 154, the inverse transform processing unit 156, the rebuilding unit 158, and the filter unit 159 may decode video data based on the syntax element extracted from the data stream, to generate decoded video data.

The syntax element may include a regular CABAC encoded/decoded binary bit and a bypass encoded/decoded binary bit. The entropy decoding unit 150 may use the regular CABAC encoding/decoding engine 166 to decode the regular CABAC encoded/decoded binary bit, and may use the bypass encoding/decoding engine 168 to decode the bypass encoded/decoded binary bit.

If intra-frame predictive coding is performed on a PU, the intra-prediction processing unit 164 may perform intra-prediction to generate a predictive sampling block of the PU. The intra-prediction processing unit 164 may generate a predictive pixel block for the PU in an intra-prediction mode based on pixel blocks for PUs with adjacent space. The intra-prediction processing unit 164 may determine the intra-prediction mode for the PU based on one or more syntax elements obtained by parsing the data stream.

The motion compensation unit 162 may construct a first reference-picture list (list 0) and a second reference-picture list (list 1) based on the syntax element obtained by parsing the data stream. In addition, if inter-frame predictive coding is performed on a PU, the entropy decoding unit 150 may parse motion information of the PU. The motion compensation unit 162 may determine one or more reference blocks for the PU based on the motion information of the PU. The motion compensation unit 162 may generate a predictive pixel block for the PU based on the one or more reference blocks for the PU.

In addition, the video decoder 30 may perform a rebuilding operation on a CU that is no longer partitioned. To perform the rebuilding operation on the CU that is no longer partitioned, the video decoder 30 may perform a rebuilding operation on each TU for the CU. By performing the rebuilding operation on each TU for the CU, the video decoder 30 may rebuild a residual pixel block associated with the CU.

During a rebuilding operation on a TU for the CU, the inverse quantization unit 154 may inversely quantize (that is, dequantize) a coefficient block associated with the TU. The inverse quantization unit 154 may determine a quantization degree by using a QP value associated with a CU corresponding to TU, and the determined quantization degree is the same as an inverse-quantization degree to be used by the inverse quantization unit 154.

After the inverse quantization unit 154 inversely quantizes the coefficient block, the inverse transform processing unit 156 may perform one or more inverse transformations on the coefficient block, so as to generate a residual sampling block associated with the TU. For example, the inverse transform processing unit 156 may perform inverse DCT, inverse integer transform, Karhunen-Loeve (Karhunen-Loeve) transform (KLT), inverse rotation transform, inverse directional transform, or another inverse transform corresponding to encoder-side transform on the coefficient block.

During application, the rebuilding unit 158 may use a residual pixel block associated with the TU for the CU and the predictive pixel block (to be specific, intra-prediction data or inter-prediction data) for the PU of the CU to rebuild a pixel block of the CU. In particular, the rebuilding unit 158 may add a sample of a residual pixel block to a corresponding sample of a predictive pixel block to rebuild the pixel block of the CU.

The filter unit 159 may perform a deblocking filtering operation to reduce a block effect of a pixel block associated with a CU of a CTB. In addition, the filter unit 159 may modify a pixel value of the CTB based on an SAO syntax element obtained by parsing the data stream. For example, the filter unit 159 may determine a corrected value based on the SAO syntax element of the CTB, and add the determined corrected value to a sampling value in a rebuilt pixel block of the CTB. By modifying some or all pixel values of a CTB of a picture, the filter unit 159 may correct a rebuilt picture of video data based on the SAO syntax element.

The video decoder 30 may store a pixel block for a CU into the decoded-picture buffer 160. The decoded-picture buffer 160 may provide a reference picture, so as to perform subsequent motion compensation, intra-prediction, and display-apparatus (for example, the display apparatus 32 in FIG. 3) presentation. For example, the video decoder 30 may perform an intra-prediction operation or an inter-prediction operation on a PU of another CU based on a pixel block in the decoded-picture buffer 160.

The present invention is an improved method proposed for partitioning an image block (CTB/CTU) when the prediction processing unit 100 is performing an prediction process.

The foregoing content has described that the prediction processing unit 100 of the encoder 20 may partition an image block by using a quadtree-plus-binary-tree partition pattern. However, there is the following problem exists in a process of partitioning an image block by using a quadtree plus a binary tree: If an image block with a size of 2N×2N is partitioned into four N×N subimage blocks, partition may be implemented by using the following three methods in FIG. 9 and FIG. 10.

Method 1: Referring to FIG. 9, the 2N×2N image block is directly partitioned into four N×N subimage blocks through quadtree partition, and this method may be marked as QT.

Method 2: Referring to FIG. 10(*a*), a binary-tree recursive partition pattern is used, where horizontal binary tree partition is first performed on the 2N×2N image block to obtain two 2N×N subimage blocks, and then vertical binary tree partition is separately performed on the two 2N×N subimage blocks, and this method is marked as HBQT.

Method 3: Referring to FIG. 10(*b*), a binary-tree recursive partition pattern is used, where vertical binary tree partition is first performed on the 2N×2N image block to obtain two 2N×N subimage blocks, and then horizontal binary tree partition is separately performed on the two 2N×N subimage blocks, and this method is marked as VBQT.

For a quadtree-plus-binary-tree partition structure, partition flexibility of an encoded block is improved, but a subimage block may be obtained not only through quadtree partition, but also through binary tree partition. There is a redundancy between quadtree partition and binary tree partition, this redundancy causes an increase in complexity of an encoder side and an increase in partition identifiers, and correspondingly, a decoder side is dragged. To be specific, the complexity and a delay of the decoder side are increased.

Figure 11:
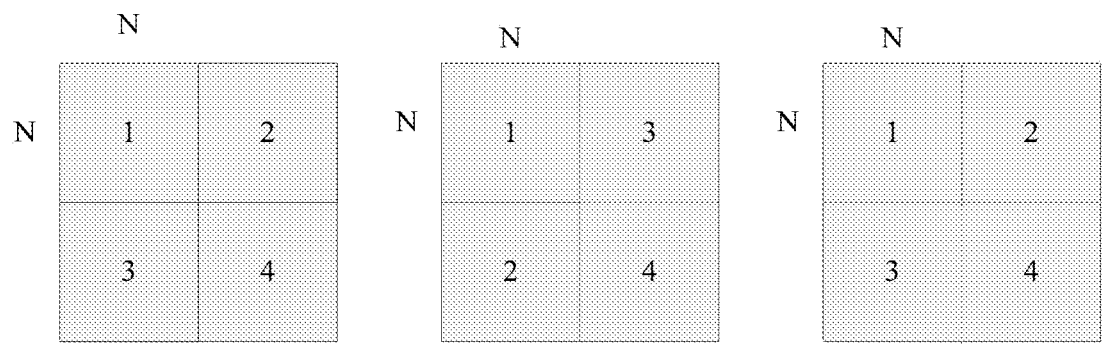
FIG. 11 is a schematic diagram of subimage block processing sequences in different partition patterns used when an image block with a size of 2N×2N is partitioned into subimage blocks with a size of N×N by using a quadtree-plus-binary-tree partition pattern.
Figure 12:
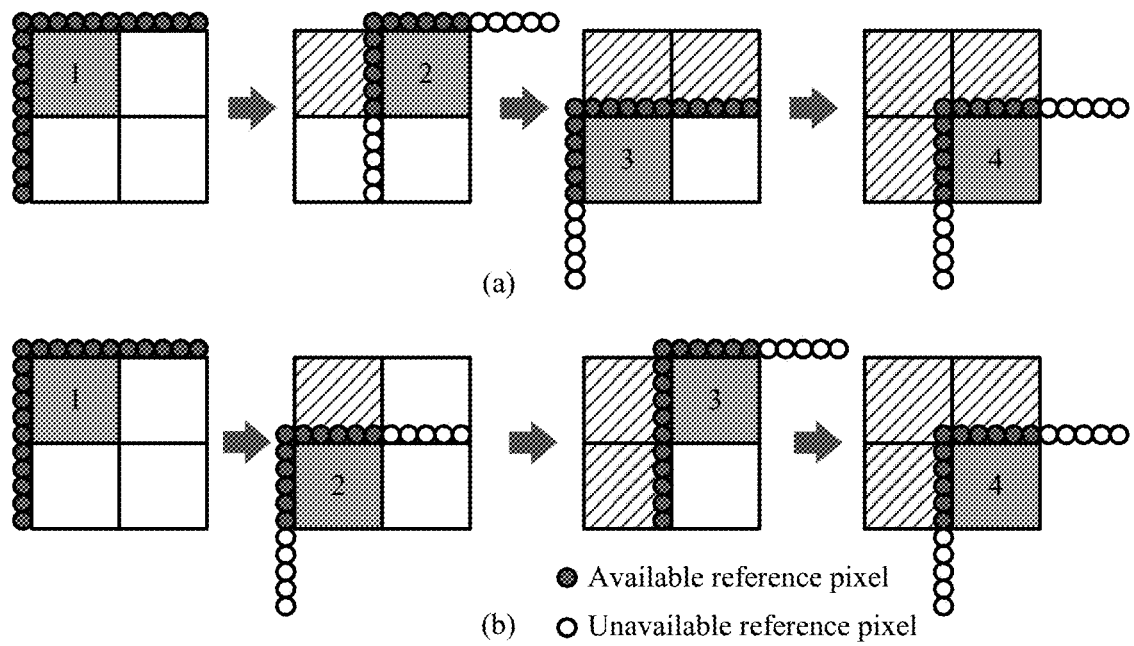
FIG. 12 is a schematic diagram of reference blocks available in different subimage processing sequences in different partition patterns used when an image block with a size of 2N×2N is partitioned into subimage blocks with a size of N×N by using a quadtree-plus-binary-tree partition pattern.

In addition, it can be learned through research and experimental analysis that although partition results obtained by using the three different partition methods are the same, it does not mean that encoding results (compression efficiency) are the same. This is because partition identifiers used in the three methods are different. In addition, processing orders of four sub-blocks are different. As shown in FIG. 11, the left is a QT processing order, the middle is an HBQT processing order, and the right is a VBQT processing order. It can be learned from this figure that a processing order of N×N subimage blocks obtained by using the QT partition pattern may be different from at least a processing order of N×N subimage blocks obtained by using the VBQT partition pattern. A difference in processing orders leads to a difference between reference pixels available in an encoding process, in particular for an I slice. As shown in FIG. 12, different processing orders lead to use of different reference pixels. The difference between the available reference pixels may lead to a difference in encoding efficiency. Therefore, to reduce a redundancy generated in the encoding process due to the quadtree-plus-binary-tree partition pattern, the present invention provides an improved idea, to be specific, a quadtree-plus-limited-binary-tree partition method. If N×N subimages are desired, when a quadtree partition pattern is available and a binary tree partition pattern is also available, N×N subimages are obtained by limiting use of HBQT; or when a quadtree partition pattern is unavailable, HBQT is allowed for obtaining the N×N subimages. A limitation on VBQT may be set in a preset manner, to be specific, may be set to be always limited or set to be always unlimited. Through research and experimental comparison, it is recommended that VBT should not be limited within an I slice, and VBT should be limited within P and B slices.

Figure 13:
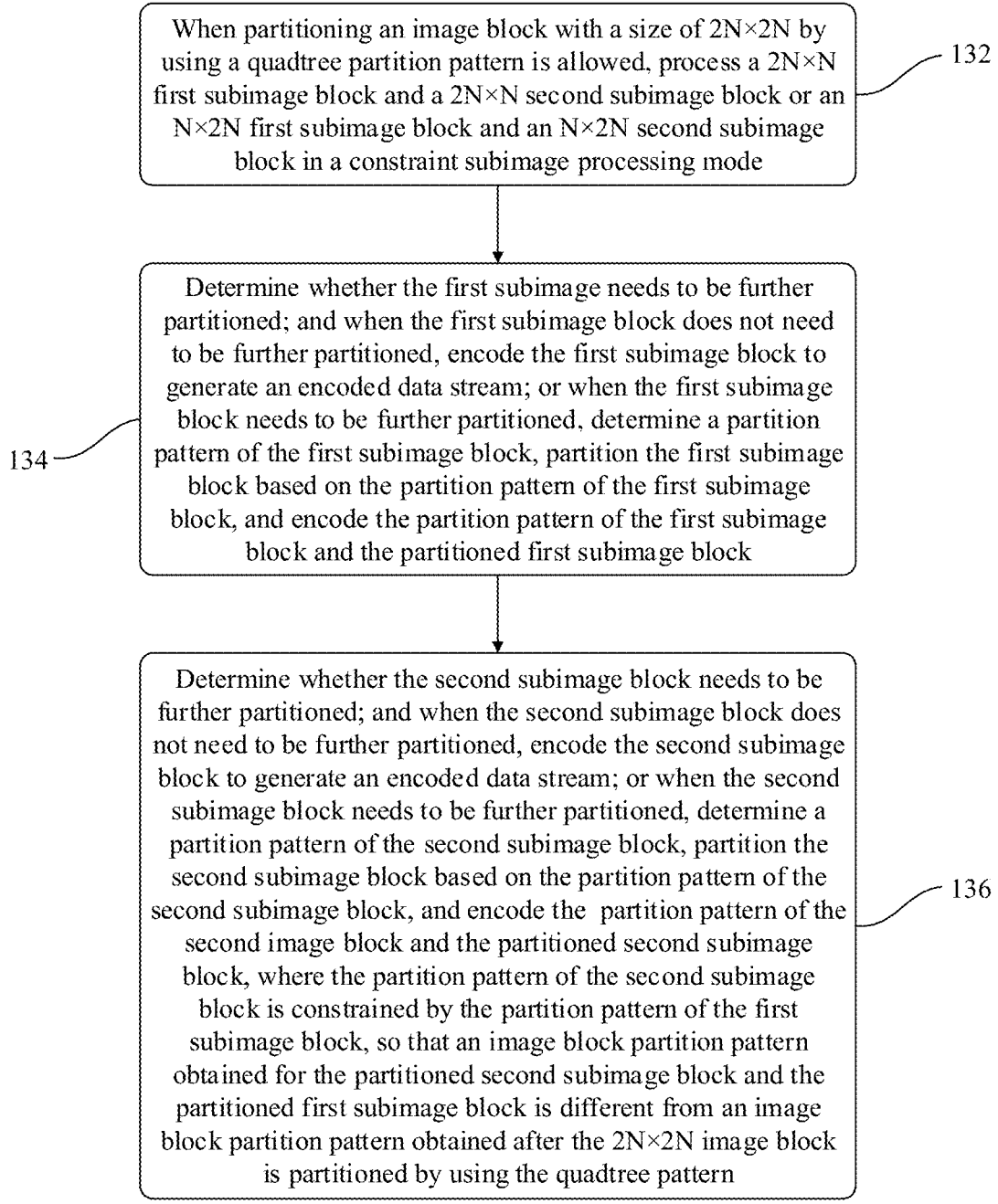
FIG. 13 is a schematic flowchart of an implementation method of an encoding method according to an embodiment of the present invention.

Based on the foregoing idea, an embodiment of the present invention provides an encoding method. The encoding method may be implemented by using the encoder 20. It should be noted that, in the following encoding method, only an improved part of the encoding method used by the described encoder 20 is described, and the encoding method used by the encoder 20 is also applicable to a part that is not described. The encoding method provided in this implementation of the present invention is shown in FIG. 13 and includes the following step:

S132. When partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N.

In an intra-prediction process, both quadtree partition and binary tree partition are allowed for the image with the size of 2N×2N. To reduce a redundancy generated in an encoding process due to a quadtree-plus-binary-tree partition pattern, the first subimage block with the size of 2N×N and the second subimage block with the size of 2N×N or the first subimage block with the size of N×2N and the second subimage block with the size of N×2N, or both the 2N×N first subimage block and the 2N×N second subimage block, and the N×2N first subimage block and the N×2N second subimage block are processed in a constraint image processing mode. A specific processing manner, that is, the constraint subimage processing mode, includes the following steps:

S134. Determine whether the first subimage block needs to be further partitioned; and when the first subimage block does not need to be further partitioned, encode the first subimage block to generate an encoded data stream; or when the first subimage block needs to be further partitioned, determine a partition pattern of the first subimage block, partition the first subimage block based on the partition pattern of the first subimage block, and encode the partition pattern of the first subimage block and the partitioned first subimage block.

S136. Determine whether the second subimage block needs to be further partitioned; and when the second subimage block does not need to be further partitioned, encode the second subimage block to generate an encoded data stream; or when the second subimage block needs to be further partitioned, determine a partition pattern of the second subimage block, partition the second subimage block based on the partition pattern of the second subimage block, and encode the image partition pattern of the second image block and the partitioned second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

That an image block partition pattern (pattern) obtained for the partitioned second subimage block and the partitioned first subimage block is different from an image block partition pattern (pattern) obtained after the 2N×2N image block is partitioned by using the quadtree partition pattern may also be understood as that a size of a subimage block obtained after at least one of the first subimage block or the second subimage block is partitioned is non N×N. That is, a constraint on a subimage partition pattern causes a difference between a size of a subimage block obtained through binary tree partition and a size of a subimage block obtained through quadtree partition, thereby eliminating a redundancy.

In the present invention, constraint processing is performed on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process. In addition, it can also be proved based on the following experimental data that for an I slice, when a quadtree partition pattern is available, encoding complexity (Enc T) can be decreased by 3% in the constraint subimage processing mode, in particular, when HBT (horizontal binary tree partition) is limited, and in addition, no impact is exerted on encoding performance.

| Seq | Y | U | V | Enc T |
|---|---|---|---|---|
| 416 × 240 | 0.0% | 0.0% | 0.0% | 96% |
| 832 × 480 | 0.0% | 0.0% | 0.0% | 97% |
| 1080 × 720 | 0.0% | 0.0% | 0.0% | 97% |
| Class B | 0.0% | 0.0% | 0.0% | 97% |
| 2560 × 1600 | 0.0% | 0.0% | 0.0% | 97 |
| Overall | 0.0% | 0.0% | 0.0% | 97% |

In the encoding method 130, in the constraint subimage processing mode, the partition pattern of the first subimage block is from a first partition pattern set, and the partition pattern of the second subimage block is from a second partition pattern set. The first partition pattern set includes at least one partition pattern different from all partition patterns in the second partition pattern set. For example, the first partition pattern set may include vertical partition and horizontal partition, and the second partition pattern set includes only horizontal partition or only vertical partition, that is, the second partition pattern set is a subset of the first partition pattern set. Specifically, a first partition pattern set for the first subimage block with the size of 2N×N includes a horizontal partition pattern and a vertical partition pattern, and the second partition pattern set includes the horizontal partition pattern; and a first partition pattern set for the first subimage block with the size of N×2N includes a horizontal partition pattern and a vertical partition pattern, and the second partition pattern set includes the vertical partition pattern. This limitation manner can be used to avoid using, in a processing process of the first subimage block and the second subimage block, a partition pattern of partitioning the 2N×2N image block into four subimage blocks with a size of N×N, thereby reducing a redundancy. In addition, in a process of performing decoding processing on a second subimage, read codewords can be reduced because a quantity of partition methods used for the second subimage block is limited. In addition, if vertical partition is performed on the 2N×N first subimage block, when only horizontal partition is allowed for the 2N×N second subimage block, in the encoding method, only performing encoding to determine whether the 2N×N second subimage block is further partitioned may be allowed, with no need to perform encoding to determine a specific partition pattern of the 2N×N second subimage block; and if the 2N×N second subimage block needs to be further partitioned, the partition pattern of the 2N×N second subimage block is horizontal partition by default. In this way, codewords for encoding can be further reduced. Correspondingly, if horizontal partition is performed on the N×2N first subimage block, when only vertical partition is allowed for the N×2N second subimage block, in an encoding method, only performing encoding to determine whether the N×2N second subimage block is further partitioned may be allowed, with no need to perform encoding to determine a specific partition pattern of the N×2N second subimage block; and if the N×2N second subimage block needs to be further partitioned, a partition pattern of the N×2N second subimage block is vertical partition by default. In this way, codewords required for encoding can be further reduced.

Optionally, during processing of the first subimage block and the second subimage block in the constraint subimage processing mode, that is, during further binary tree partition, the first subimage block is processed before the second subimage block is processed. Therefore, a partition pattern of the second subimage block may depend on a partition pattern of the first subimage block, that is, the partition pattern of the second subimage block depends on/is constrained by the partition pattern of the first subimage block. Details may be as follows: When the first subimage block and the second subimage block have a size of 2N×N and the partition pattern of the first subimage block is a vertical partition pattern, the partition pattern of the second subimage block is horizontal partition; or when the first subimage block and the second subimage block have a size of 2N×N and the partition pattern of the first subimage block is a non-vertical partition pattern, the partition pattern of the second subimage block is vertical partition or horizontal partition; or when the first subimage block and the second subimage block have a size of N×2N and the partition pattern of the first subimage block is horizontal partition, the partition pattern of the second subimage block is vertical partition; or when the first subimage block and the second subimage block have a size of N×2N and the partition pattern of the first subimage block is non-horizontal partition, the partition pattern of the second subimage block is horizontal partition or vertical partition.

Optionally, when quadtree partition is allowed, the constraint subimage processing mode is available only for a subimage block obtained by using a particular partition pattern, to be specific, is used only to process the subimage block obtained by using the particular partition pattern. For example, when an image block with a size of 2N×2N is partitioned into an N×2N first subimage block and an N×2N second subimage block, the constraint subimage processing mode may be used. Specifically, in this partition pattern, the constraint subimage processing mode may be: It is limited that a horizontal partition method cannot be used for the second subimage block, that is, HBT is not used; or a partition pattern of the second subimage block is determined based on a partition pattern of the first subimage block, that is, when a horizontal partition pattern is used for the first subimage block, the horizontal partition pattern cannot be used for the second subimage, or when a vertical partition pattern is used for the first subimage block, a horizontal partition pattern or the vertical partition pattern may be used for the second subimage. In addition, when an image block with a size of 2N×2N is partitioned into a 2N×N first subimage block and a 2N×N second subimage block, a same partition pattern or different partition patterns may be used for the 2N×N first subimage block and the 2N×N second subimage block, and the 2N×N first subimage block and the 2N×N second subimage block are not processed in the constraint subimage processing mode. In this way, flexibility of a processing process can be improved.

Optionally, the encoding method 130 may further include: when partitioning an image block with a size of 2N×2N by using a quadtree partition pattern is not allowed, processing a 2N×N first subimage block and a 2N×N second subimage block or an N×2N first subimage block and an N×2N second subimage block in a non-constraint subimage processing mode, where the 2N×N first subimage block and the 2N×N second subimage block or the N×2N first subimage block and the N×2N second subimage block are obtained by partitioning the image block with the size of 2N×2N. The non-constraint subimage processing mode includes: determining whether the first subimage block needs to be further partitioned; and when the first subimage block does not need to be further partitioned, encoding the first subimage block to generate an encoded data stream; or when the first subimage block needs to be further partitioned, determining a partition pattern of the first subimage block, partitioning the first subimage block based on the partition pattern of the first subimage block, and encoding the partition pattern of the first subimage block and the partitioned first subimage block, where the partition pattern of the first subimage block is from a first partition pattern set. The non-constraint subimage processing mode further includes: determining whether the second subimage block needs to be further partitioned; and when the second subimage block does not need to be further partitioned, encoding the second subimage block to generate an encoded data stream; or when the second subimage block needs to be further partitioned, determining a partition pattern of the second subimage block, partitioning the second subimage block based on the partition pattern of the second subimage block, and encoding the partition pattern of the second subimage block and the partitioned second subimage block, where the partition pattern of the second subimage block is from a second partition pattern set, and all partition patterns in the first partition pattern set are the same as all partition patterns in the second partition pattern set.

In this processing manner, the following can be ensured: When the quadtree partition pattern cannot be used, for example, according to an existing rule, when a quadtree leaf node is partitioned by using a binary tree, leaf nodes obtained through binary tree partition cannot be partitioned by using a quadtree, and using a non-constraint subimage processing mode to obtain subimage blocks with a size of N×N is allowed. This can ensure that a gain brought in a quadtree partition pattern can be fully used for an image.

Preferably, the constraint subimage processing mode is used to encode an I slice (slice), or may be used to encode a P slice or a B slice.

Figure 14:
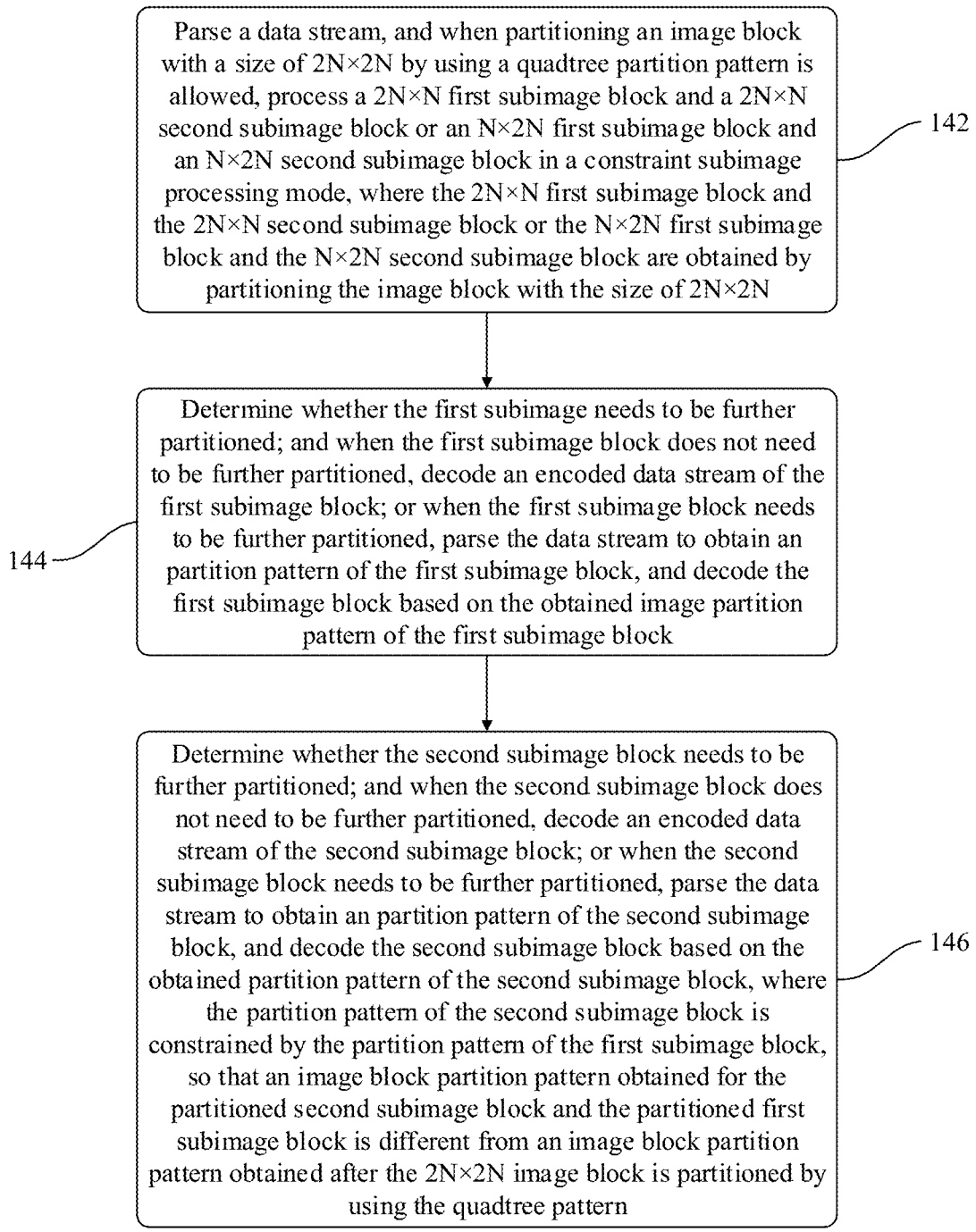
FIG. 14 is a schematic flowchart of an implementation method of a decoding method according to an embodiment of the present invention.

Corresponding to the encoding method 13, an embodiment of the present invention further provides a decoding method. The decoding method may be implemented by the decoder 30. It should be noted that, in the following decoding method, only an improved part of the decoding method used by the described decoder 30 is described, and the decoding method used by the decoder 30 is also applicable to a part that is not described. As shown in FIG. 14, the decoding method 140 includes the following step:

S142. Parse a data stream, and when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N.

In an intra-prediction process, both quadtree partition and binary tree partition are allowed for the image with the size of 2N×2N. To reduce a redundancy generated in an encoding process due to a quadtree-plus-binary-tree partition pattern, the first subimage block with the size of 2N×N and the second subimage block with the size of 2N×N or the first subimage block with the size of N×2N and the second subimage block with the size of N×2N, or both the 2N×N first subimage block and the 2N×N second subimage block, and the N×2N first subimage block and the N×2N second subimage block are processed in a constraint image processing mode. A specific processing manner, that is, the constraint subimage processing mode, includes the following steps:

S144. Determine whether the first subimage block needs to be further partitioned; and when the first subimage block does not need to be further partitioned, decode an encoded data stream of the first subimage block; or when the first subimage block needs to be further partitioned, parse the data stream to obtain a partition pattern of the first subimage block, and decode the first subimage block based on the obtained partition pattern of the first subimage block.

S146. Determine whether the second subimage block needs to be further partitioned; and when the second subimage block does not need to be further partitioned, decode an encoded data stream of the second subimage block; or when the second subimage block needs to be further partitioned, parse the data stream to obtain a partition pattern of the second subimage block, and decode the second subimage block based on the obtained partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

That an image block partition pattern (pattern) obtained for the partitioned second subimage block and the partitioned first subimage block is different from an image block partition pattern (pattern) obtained after the 2N×2N image block is partitioned by using the quadtree partition pattern may also be understood as that a size of a subimage block obtained after at least one of the first subimage block or the second subimage block is partitioned is non N×N. That is, a constraint on a subimage partition pattern causes a difference between a size of a subimage block obtained through binary tree partition and a size of a subimage block obtained through quadtree partition, thereby eliminating a redundancy.

In the present invention, constraint processing is performed on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

In the decoding method 140, in the constraint subimage processing mode, the partition pattern of the first subimage block is from a first partition pattern set, and the partition pattern of the second subimage block is from a second partition pattern set. The first partition pattern set includes at least one partition pattern different from all partition patterns in the second partition pattern set. For example, the first partition pattern set may include vertical partition and horizontal partition, and the second partition pattern set includes only horizontal partition or only vertical partition, that is, the second partition pattern set is a subset of the first partition pattern set. Specifically, a first partition pattern set for the first subimage block with the size of 2N×N includes a horizontal partition pattern and a vertical partition pattern, and the second partition pattern set includes the horizontal partition pattern; and a first partition pattern set for the first subimage block with the size of N×2N includes a horizontal partition pattern and a vertical partition pattern, and the second partition pattern set includes the vertical partition pattern. This limitation manner can be used to avoid using, in a processing process of the first subimage block and the second subimage block, a partition pattern of partitioning the 2N×2N image block into four subimage blocks with a size of N×N, thereby reducing a redundancy. In addition, in a process of performing decoding processing on a second subimage, read codewords can be reduced because a quantity of partition methods used for the second subimage block is limited. In addition, if vertical partition is performed on the 2N×N first subimage block, when only horizontal partition is allowed for the 2N×N second subimage block, in the decoding method, only performing decoding to determine whether the 2N×N second subimage block is further partitioned may be allowed, with no need to perform decoding to determine a specific partition pattern of the 2N×N second subimage block; and if the 2N×N second subimage block needs to be further partitioned, the partition pattern of the 2N×N second subimage block is horizontal partition by default. In this way, data streams that need to be read can be further reduced. Correspondingly, if horizontal partition is performed on the N×2N first subimage block, when only vertical partition is allowed for the N×2N second subimage block, in the decoding method, only determining whether the N×2N second subimage block is further partitioned may be allowed, with no need to perform decoding to determine a specific partition pattern of the N×2N second subimage block; and if the N×2N second subimage block needs to be further partitioned, the partition pattern of the N×2N second subimage block is vertical partition by default. In this way, data streams that need to be read can be further reduced.

Optionally, during processing of the first subimage block and the second subimage block in the constraint subimage processing mode, that is, during further binary tree partition, the first subimage block is processed before the second subimage block is processed. Therefore, a partition pattern of the second subimage block may depend on a partition pattern of the first subimage block, that is, the partition pattern of the second subimage block is determined by the partition pattern of the first subimage block. Details may be as follows: When the first subimage block and the second subimage block have a size of 2N×N and the partition pattern of the first subimage block is a vertical partition pattern, the partition pattern of the second subimage block is horizontal partition; or when the first subimage block and the second subimage block have a size of 2N×N and the partition pattern of the first subimage block is a non-vertical partition pattern, the partition pattern of the second subimage block is vertical partition or horizontal partition; or when the first subimage block and the second subimage block have a size of N×2N and the partition pattern of the first subimage block is horizontal partition, the partition pattern of the second subimage block is vertical partition; or when the first subimage block and the second subimage block have a size of N×2N and the partition pattern of the first subimage block is non-horizontal partition, the partition pattern of the second subimage block is horizontal partition or vertical partition.

Optionally, when quadtree partition is allowed, the constraint subimage processing mode is available only for a subimage block obtained by using a particular partition pattern, to be specific, is used only to process the subimage block obtained by using the particular partition pattern. For example, when an image block with a size of 2N×2N is partitioned into an N×2N first subimage block and an N×2N second subimage block, the constraint subimage processing mode may be used. Specifically, in this partition pattern, the constraint subimage processing mode may be: It is limited that a horizontal partition method cannot be used for the second subimage block, that is, HBT is not used; or a partition pattern of the second subimage block is determined based on a partition pattern of the first subimage block, that is, when a horizontal partition pattern is used for the first subimage block, the horizontal partition pattern cannot be used for the second subimage block, or when a vertical partition pattern is used for the first subimage block, a horizontal partition pattern or the vertical partition pattern may be used for the second subimage. In addition, when an image block with a size of 2N×2N is partitioned into a 2N×N first subimage block and a 2N×N second subimage block, a same partition pattern or different partition patterns may be used for the first subimage block and the second subimage block, and the first subimage block and the second subimage block are not processed in the constraint subimage processing mode. In this way, flexibility of a processing process can be improved.

Optionally, the decoding method 140 may further include: when partitioning an image block with a size of 2N×2N by using a quadtree partition pattern is not allowed, processing a 2N×N first subimage block and a 2N×N second subimage block or an N×2N first subimage block and an N×2N second subimage block in a non-constraint subimage processing mode, where the 2N×N first subimage block and the 2N×N second subimage block or the N×2N first subimage block and the N×2N second subimage block are obtained by partitioning the image block with the size of 2N×2N. The non-constraint subimage processing mode includes: determining whether the first subimage block needs to be further partitioned; and when the first subimage block does not need to be further partitioned, decoding the first subimage block to generate an encoded data stream; or when the first subimage block needs to be further partitioned, parsing the data stream to obtain a partition pattern of the first subimage block, and decoding the first subimage block based on the obtained partition pattern of the first subimage block, where the partition pattern of the first subimage block is from a first partition pattern set. The non-constraint subimage processing mode further includes: determining whether the second subimage block needs to be further partitioned; and when the second subimage block does not need to be further partitioned, decoding an encoded data stream of the second subimage block; or when the second subimage block needs to be further partitioned, parsing the data stream to obtain a partition pattern of the second subimage block, and decoding the second subimage block based on the obtained partition pattern of the second subimage block, where the partition pattern of the second subimage block is from a second partition pattern set, and all partition patterns in the first partition pattern set are the same as all partition patterns in the second partition pattern set.

In this processing manner, the following can be ensured: When the quadtree partition pattern cannot be used, for example, according to an existing rule, when a quadtree leaf node is partitioned by using a binary tree, leaf nodes obtained through binary tree partition cannot be partitioned by using a quadtree, and using a non-constraint subimage processing mode to obtain subimage blocks with a size of N×N is allowed. This can ensure that a gain brought in a quadtree partition pattern can be fully used for an image.

Preferably, the constraint subimage processing mode is used to decode an I slice (slice), or may be used to decode a P slice or a B slice.

Based on the foregoing idea, an embodiment of the present invention provides another encoding method 150. As shown in FIG. 15, the encoding method 150 includes the following step:

S152. When partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N, and the constraint subimage processing mode includes the following steps:

S154. Determine a partition pattern of the first subimage, encode the partition pattern of the first image block, and encode the first subimage block based on the partition pattern of the first subimage block.

S156. Determine a partition pattern of the second subimage block, encode the partition pattern of the second image block, and encode the second subimage block based on the partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

In the encoding method, the subimage block with the size of N×2N or the subimage block with the size of 2N×N is encoded in the constraint subimage processing mode, thereby reducing a redundancy existing when an image is partitioned by using a quadtree plus a binary tree.

The encoding method provided in this implementation has all beneficial effects of the encoding method 130, and may require fewer data streams. In addition, unless otherwise specified, the encoding method 150 is applicable to all of the foregoing extended modes of the encoding method 130. For brevity, details are not repeated herein. All applicable limitations of the encoding method 130, to be specific, extended modes, are referred to herein as limitation and extension of the encoding method 150.

A difference between the encoding method 150 and the encoding method 130 lies in that in the encoding method 150, for the 2N×N first subimage block and the 2N×N second subimage block, the first partition pattern set includes no partition, a horizontal partition pattern, and a vertical partition pattern, and the second partition pattern set includes no partition and the horizontal partition pattern; and for the N×2N first subimage block and the N×2N second subimage block, the first partition pattern set includes no partition, a horizontal partition pattern, and a vertical partition pattern, and the second partition pattern set includes no partition and the vertical partition pattern.

In addition, the difference between the encoding method 150 and the encoding method 130 lies in that in the encoding method 150, that the partition pattern of the second subimage block is constrained by the partition pattern of the first subimage block includes: when the first subimage block and the second subimage block have a size of 2N×N and the partition pattern of the first subimage block is a vertical partition pattern, the partition pattern of the second subimage block is no partition or horizontal partition; or when the first subimage block and the second subimage block have a size of 2N×N and the partition pattern of the first subimage block is a non-vertical partition pattern, the partition pattern of the second subimage block is no partition, vertical partition, or horizontal partition; or when the first subimage block and the second subimage block have a size of N×2N and the partition pattern of the first subimage block is horizontal partition, the partition pattern of the second subimage block is no partition or vertical partition; or when the first subimage block and the second subimage block have a size of N×2N and the partition pattern of the first subimage block is non-horizontal partition, the partition pattern of the second subimage block is no partition, horizontal partition, or vertical partition.

Corresponding to the encoding method 15, an embodiment of the present invention further provides a decoding method 160. The decoding method 160 is shown in FIG. 16. A difference between the decoding method 160 and the decoding method 140 lies in that in the decoding method 160, an encoded data stream is directly decoded according to an image block partition indication in a data stream, with no need to predetermine, based on the data stream, whether a subimage block with a size of N×2N or a 2N×N image block needs to be further partitioned, and then performing decoding. In this way, determining logic can be reduced, thereby reducing decoding complexity. Specifically, the decoding method 160 specifically includes the following step:

S162. Parse a data stream, and when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N, and the constraint subimage processing mode includes the following steps:

S164. Parse the data stream to determine a partition identifier of the first subimage block, determine a partition pattern of the first subimage block based on the partition identifier of the first subimage block, and decode the first subimage block based on the partition pattern of the first subimage block.

S166. Parse the data stream to determine a partition identifier of the second subimage block, determine a partition pattern of the second subimage block based on the partition identifier of the second subimage block, and decode the second subimage block based on the partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

The decoding method provided in this implementation has all beneficial effects of the decoding method 140, and may require fewer data streams. In addition, unless otherwise specified, the decoding method 160 is applicable to all of the foregoing extended modes of the decoding method 140. For brevity, details are not repeated herein. All applicable limitations of the decoding method 140, to be specific, extended modes, are referred to herein as limitation and extension of decoding method 160.

A difference between the decoding method 160 and the decoding method 140 lies in that in the decoding method 160, for the 2N×N first subimage block and the 2N×N second subimage block, the first partition pattern set includes no partition, a horizontal partition pattern, and a vertical partition pattern, and the second partition pattern set includes no partition and the horizontal partition pattern; and for the N×2N first subimage block and the N×2N second subimage block, the first partition pattern set includes no partition, a horizontal partition pattern, and a vertical partition pattern, and the second partition pattern set includes no partition and the vertical partition pattern.

In addition, the difference between the decoding method 160 and the decoding method 140 lies in that in the decoding method 160, that the partition pattern of the second subimage block is constrained by the partition pattern of the first subimage block includes: when the first subimage block and the second subimage block have a size of 2N×N and the partition pattern of the first subimage block is a vertical partition pattern, the partition pattern of the second subimage block is no partition or horizontal partition; or when the first subimage block and the second subimage block have a size of 2N×N and the partition pattern of the first subimage block is a non-vertical partition pattern, the partition pattern of the second subimage block is no partition, vertical partition, or horizontal partition; or when the first subimage block and the second subimage block have a size of N×2N and the partition pattern of the first subimage block is horizontal partition, the partition pattern of the second subimage block is no partition or vertical partition; or when the first subimage block and the second subimage block have a size of N×2N and the partition pattern of the first subimage block is non-horizontal partition, the partition pattern of the second subimage block is no partition, horizontal partition, or vertical partition.

Figure 17:
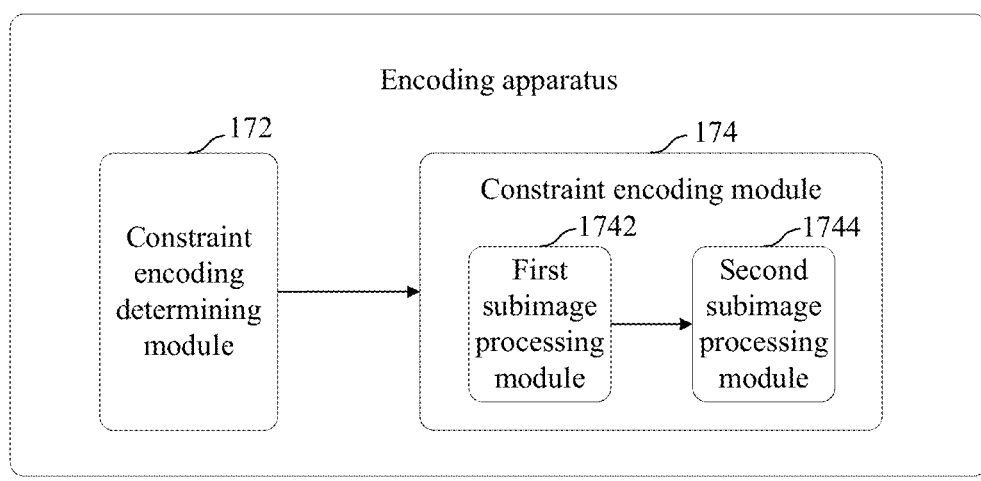
FIG. 17 is a schematic block diagram of an encoding apparatus according to an embodiment of the present invention.

Referring to FIG. 17, the present invention further provides an encoding apparatus 170 configured to implement the encoding method 130. The encoding apparatus 170 has a same architecture as the encoder 20 described above in the present invention. A difference lies in that a partition pattern used by the encoding apparatus 170 for partitioning an image block during intra-prediction is different from that used by the encoder 20, but the encoding apparatus 170 can implement all other encoding processing processes in a same manner as the encoder 20. Specifically, the encoding apparatus 170 includes:

a constraint encoding determining module 172, configured to: when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and a constraint encoding module 174 that is configured to implement the constraint subimage processing mode and that includes:

a first subimage processing module 1742, configured to: determine whether the first subimage block needs to be further partitioned; and when the first subimage block does not need to be further partitioned, encode the first subimage block to generate an encoded data stream; or when the first subimage block needs to be further partitioned, determine a partition pattern of the first subimage block, partition the first subimage block based on the partition pattern of the first subimage block, and encode the partition pattern of the first subimage block and the partitioned first subimage block; and a second subimage processing module 1744, configured to: determine whether the second subimage block needs to be further partitioned; and when the second subimage block does not need to be further partitioned, encode the second subimage block to generate an encoded data stream; or when the second subimage block needs to be further partitioned, determine a partition pattern of the second subimage block, partition the second subimage block based on the partition pattern of the second subimage block, and encode the image partition pattern of the second image block and the partitioned second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

In the present invention, the encoding apparatus 170 performs constraint processing on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

Figure 18:
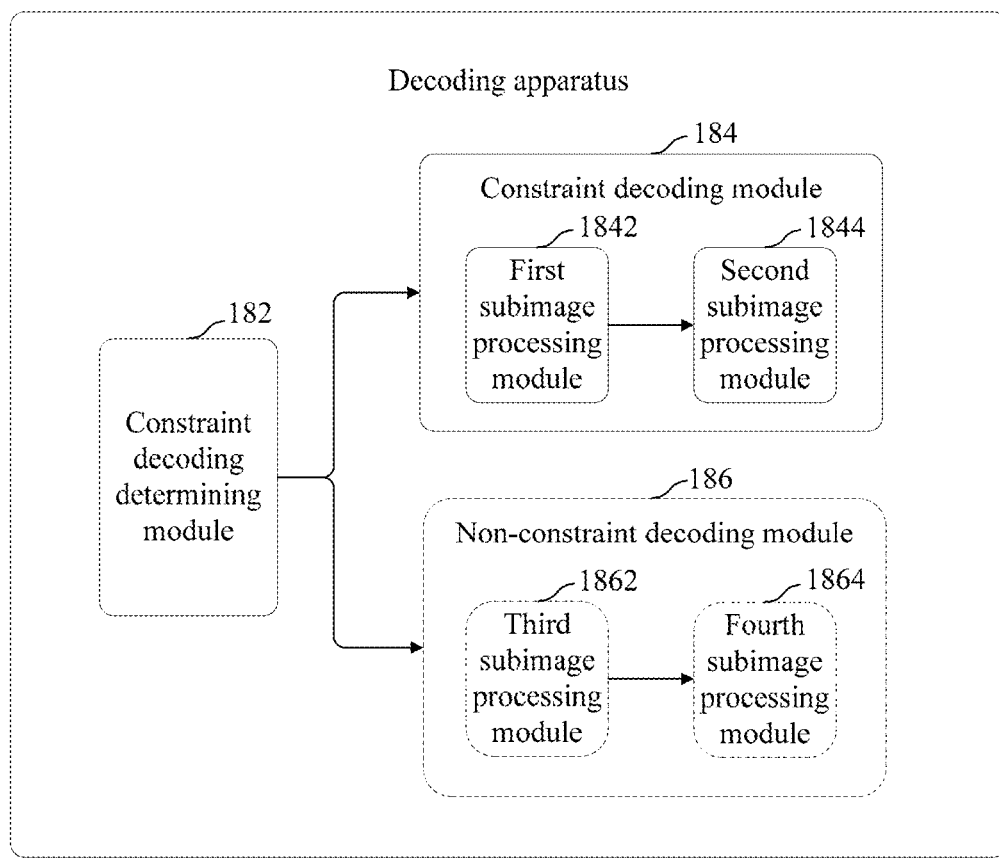
FIG. 18 is a schematic block diagram of a decoding apparatus according to an embodiment of the present invention.

Referring to FIG. 18, the present invention further provides a decoding apparatus 180 configured to implement the decoding method 140. The decoding apparatus 180 has a same architecture as the decoder 30 described above in the present invention, and a difference lies in that a partition pattern used by the decoding apparatus 180 for partitioning an image block during intra-prediction is different from that used by the decoder 30, but the decoding apparatus 180 can implement all other encoding processing processes in a same manner as the decoder 30. Specifically, the decoding apparatus 180 includes:

a constraint decoding determining module 182, configured to: parse a data stream, and when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and a constraint decoding module 184 that is configured to implement the constraint subimage processing mode and that includes:

a first subimage processing module 1842, configured to: determine whether the first subimage block needs to be further partitioned; and when the first subimage block does not need to be further partitioned, decode an encoded data stream of the first subimage block; or when the first subimage block needs to be further partitioned, parse the data stream to obtain a partition pattern of the first subimage block, and decode the first subimage block based on the obtained partition pattern of the first subimage block; and a second subimage processing module 1844, configured to: determine whether the second subimage block needs to be further partitioned; and when the second subimage block does not need to be further partitioned, decode an encoded data stream of the second subimage block; or when the second subimage block needs to be further partitioned, parse the data stream to obtain a partition pattern of the second subimage block, and decode the second subimage block based on the obtained partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

The decoding apparatus 180 provided in this implementation of the present invention performs constraint processing on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

Optionally, the constraint decoding determining module 182 is further configured to: when partitioning the 2N×2N image block by using a quadtree partition pattern is not allowed, process encoded data streams of the first subimage block and the second subimage block in a non-constraint subimage processing mode; and correspondingly, the decoding apparatus 180 further includes: a non-constraint decoding module 186 that is configured to implement the non-constraint subimage processing mode and that includes:

a third subimage processing module 1862, configured to: parse the data stream to determine a partition identifier of the first subimage block, determine a partition pattern of the first subimage block based on the partition identifier of the first subimage block, and decode the first subimage block based on the partition pattern of the first subimage block; and a fourth subimage processing module 1864, configured to: parse the data stream to determine a partition identifier of the second subimage block, determine a partition pattern of the second subimage block based on the partition identifier of the second subimage block, and decode the second subimage block based on the partition pattern of the second subimage block, where the partition pattern of the first subimage block and the partition pattern of the second subimage block are selected from a same partition pattern set.

Figure 19:
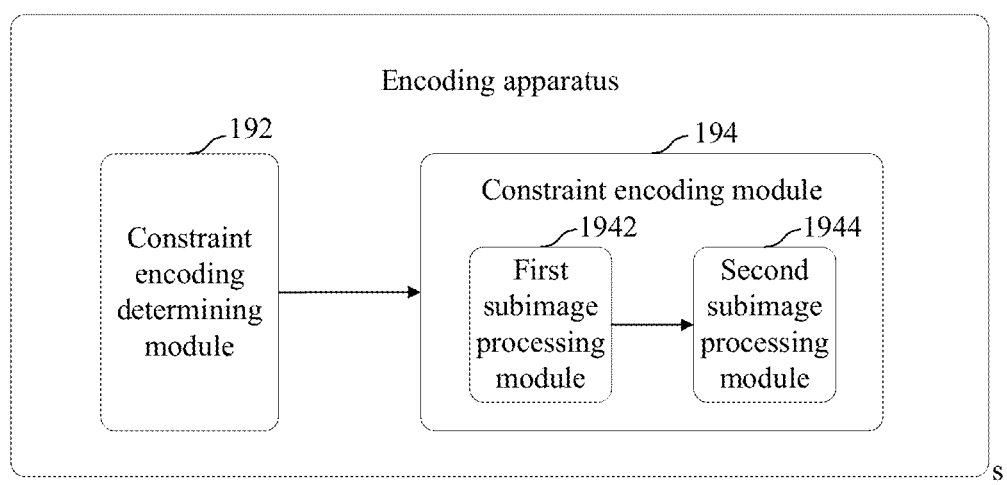
FIG. 19 is a schematic block diagram of an encoding apparatus according to another embodiment of the present invention.

Referring to FIG. 19, the present invention further provides an encoding apparatus 190 configured to implement the encoding method 150. The encoding apparatus 190 has a same architecture as the encoder 20 described above in the present invention. A difference lies in that a partition pattern used by the encoding apparatus 190 for partitioning an image block during intra-prediction is different from that used by the encoder 20, but the encoding apparatus 190 can implement all other encoding processing processes in a same manner as the encoder 20. Specifically, the encoding apparatus 190 includes:

a constraint encoding determining module 192, configured to: when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and a constraint encoding module 194 that is configured to implement the constraint subimage processing mode and that includes:

a first subimage processing module 1942, configured to: determine a partition pattern of the first subimage, encode the partition pattern of the first image block, and encode the first subimage block based on the partition pattern of the first subimage block; and a second subimage processing module 1944, configured to: determine a partition pattern of the second subimage block, encode the partition pattern of the second image block, and encode the second subimage block based on the partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

In the present invention, the encoding apparatus 190 performs constraint processing on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

Figure 20:
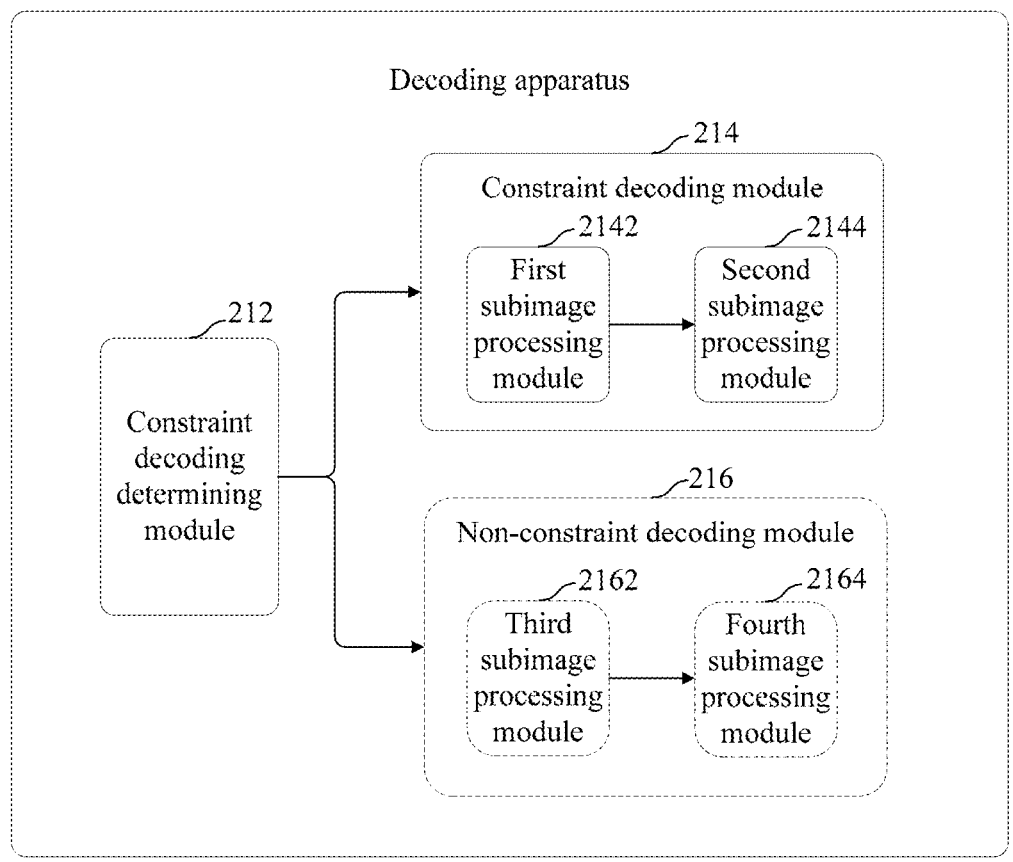
FIG. 20 is a schematic block diagram of a decoding apparatus according to another embodiment of the present invention.

Referring to FIG. 20, the present invention further provides a decoding apparatus 210 configured to implement the decoding method 160. The decoding apparatus 210 has a same architecture as the decoder 30 described above in the present invention, and a difference lies in that a partition pattern used by the decoding apparatus 210 for partitioning an image block during intra-prediction is different from that used by the decoder 30, but the decoding apparatus 210 can implement all other encoding processing processes in a same manner as the decoder 30. Specifically, the decoding apparatus 210 includes:

a constraint decoding determining module 212, configured to: parse a data stream, and when partitioning an image block with a size of 2N×2N by using a quadtree partition pattern is allowed, process a 2N×N first subimage block and a 2N×N second subimage block or an N×2N first subimage block and an N×2N second subimage block in a constraint subimage processing mode, where the 2N×N first subimage block and the 2N×N second subimage block or the N×2N first subimage block and the N×2N second subimage block are obtained by partitioning the image block with the size of 2N×2N; and a constraint decoding module 214 that is configured to implement the constraint subimage processing mode and that includes:

a first subimage processing module 2142, configured to: parse the data stream to determine a partition identifier of the first subimage block, determine a partition pattern of the first subimage block based on the partition identifier of the first subimage block, and decode the first subimage block based on the partition pattern of the first subimage block; and a second subimage processing module 2144, configured to: parse the data stream to determine a partition identifier of the second subimage block, determine a partition pattern of the second subimage block based on the partition identifier of the second subimage block, and decode the second subimage block based on the partition pattern of the second subimage block, where the partition pattern of the second subimage block is constrained by the partition pattern of the first subimage block, so that an image block partition pattern (pattern) obtained for the partitioned second subimage block and the partitioned first subimage block is different from an image block partition pattern (pattern) obtained after the 2N×2N image block is partitioned by using the quadtree partition pattern.

The decoding apparatus 210 provided in this implementation of the present invention performs constraint processing on the 2N×N first subimage block and the 2N×N second subimage block and/or the N×2N first subimage and the N×2N second subimage block in the constraint subimage processing mode, thereby reducing a redundancy existing in a quadtree-plus-binary-tree partition process.

Optionally, the constraint decoding determining module 212 is further configured to: when partitioning the 2N×2N image block by using a quadtree partition pattern is not allowed, process encoded data streams of the first subimage block and the second subimage block in a non-constraint subimage processing mode; and correspondingly, the decoding apparatus 210 further includes: a non-constraint decoding module 216 that is configured to implement the non-constraint subimage processing mode and that includes:

a third subimage processing module 2162, configured to: parse the data stream to determine a partition identifier of the first subimage block, determine a partition pattern of the first subimage block based on the partition identifier of the first subimage block, and decode the first subimage block based on the partition pattern of the first subimage block; and a fourth subimage processing module 2164, configured to: parse the data stream to determine a partition identifier of the second subimage block, determine a partition pattern of the second subimage block based on the partition identifier of the second subimage block, and decode the second subimage block based on the partition pattern of the second subimage block, where the partition pattern of the first subimage block and the partition pattern of the second subimage block are selected from a same partition pattern set.

The encoding apparatus and the decoding apparatus in the foregoing implementations of the present invention may be applied to various electronic apparatuses. For example, the following provides an example in which embodiments of the present invention are applied to a television device and a mobile phone.

Figure 21:
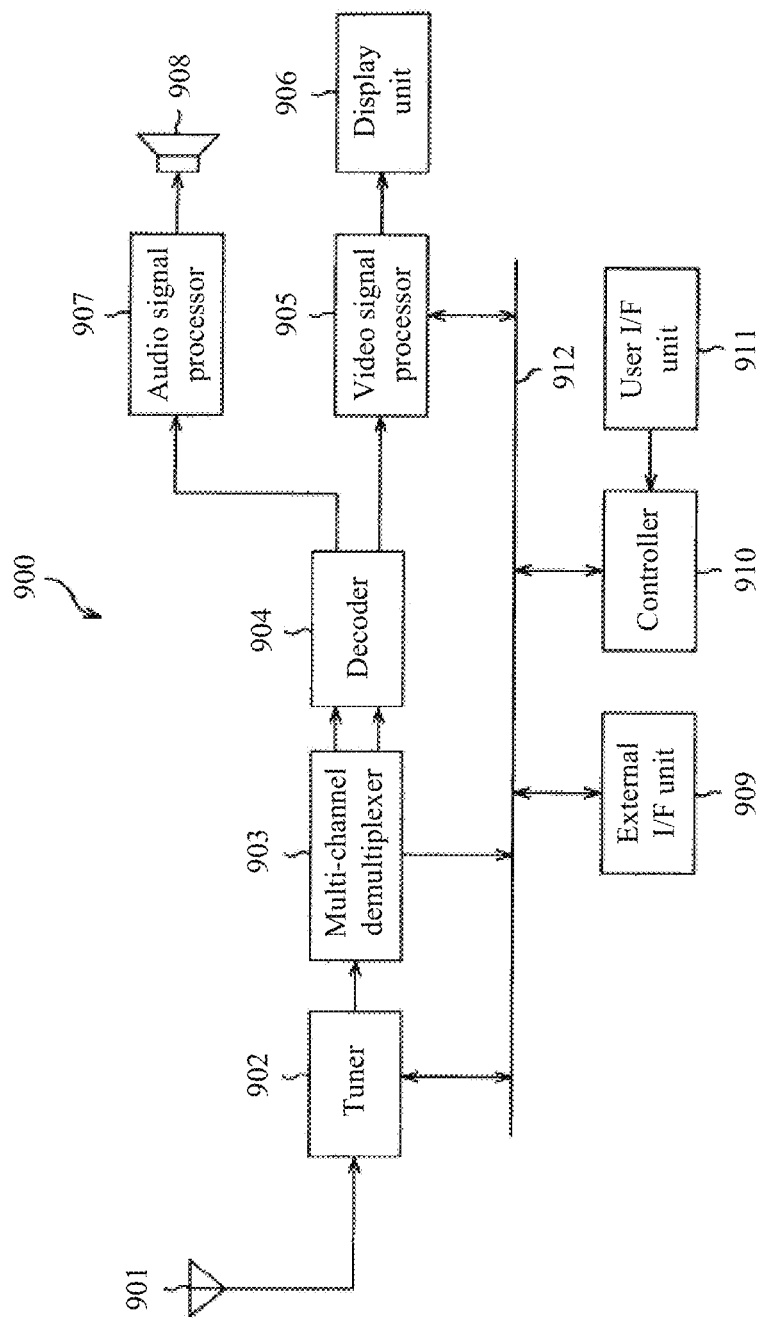
FIG. 21 is a schematic structural diagram of an applicable television application according to an embodiment of the present invention.

FIG. 21 is a schematic structural diagram of an applicable television application according to an embodiment of the present invention. A television device 900 includes an antenna 901, a tuner 902, a multi-channel demultiplexer 903, a decoder 904, a video signal processor 905, a display unit 906, an audio signal processor 907, a loudspeaker 908, an external interface 909, a controller 910, a user interface 911, and a bus 912.

The tuner 902 extracts an expected frequency channel signal from a broadcast signal received through the antenna 901, and demodulates the extracted signal. Then the tuner 902 outputs an encoded bitstream obtained through demodulation to the multi-channel demultiplexer 903. That is, the tuner 902 is used as a sending apparatus in the television device 900 that receives an encoded data stream of an encoded image.

The multi-channel demultiplexer 903 separates, from the encoded bitstream, a video stream and an audio stream of a program to be watched, and outputs the separated streams to the decoder 904. The multi-channel demultiplexer 903 further extracts auxiliary data from the encoded bitstream, for example, an electronic program guide, and provides the extracted data for the controller 910. If the encoded bitstream is scrambled, the multi-channel demultiplexer 903 may descramble the encoded bitstream.

The decoder 904 decodes the video stream and the audio stream that are input by the multi-channel demultiplexer 903. Then the decoder 904 outputs video data generated through decoding to the video signal processor 905. The decoder 904 further outputs audio data generated through decoding to the audio signal processor 907.

The video signal processor 905 reproduces the video data input by the decoder 904, and displays the video data on the display unit 906. The video signal processor 905 may further display, on the display unit 906, an application pane provided through a network. In addition, the video signal processor 905 may perform additional processing, for example, denoising, on the video data based on a setting. The video signal processor 905 may further generate a GUI (graphical user interface) image and make the generated image overlapped onto an output image.

The display unit 906 is driven by a drive signal provided by the video signal processor 905, and displays a video or an image on a video screen of a display apparatus, for example, a liquid crystal display, a plasma display, or an OELD (organic electroluminescent display).

The audio signal processor 907 performs reproduction processing, for example, digital-to-analog conversion and amplification, on audio data input by the decoder 904, and outputs audio by using the loudspeaker 908. In addition, the audio signal processor 907 may perform additional processing, for example, denoising, on the audio data.

The external interface 909 is an interface configured to connect the television device 900 and an external apparatus or network. For example, the video stream or audio stream received by the external interface 909 may be decoded by the decoder 904. That is, the external interface 909 is also used as a sending apparatus in the television device 900 that receives the encoded data stream of the encoded image.

The controller 910 includes a processor and a memory. The memory stores a program to be executed by the processor, program data, auxiliary data, data obtained through the network, or the like. For example, when the television device 900 is started, the program stored in the memory is read and executed by the processor. The processor controls an operation of the television device 900 based on a control signal input from the user interface 911.

The user interface 911 is connected to the controller 910. For example, the user interface 911 includes a button and a switch that are used by a user to operate the television device 900 and a receiving unit configured to receive a remote control signal. The user interface 911 detects an operation executed by the user by using the components, generates a control signal, and outputs the generated control signal to the controller 910.

The bus 912 implements mutual connection between the tuner 902, the multi-channel demultiplexer 903, the decoder 904, the video signal processor 905, the audio signal processor 907, the external interface 909, and the controller 910.

In the television device 900 having this structure, the decoder 904 has a function of the video decoding apparatus according to the foregoing embodiment.

Figure 22:
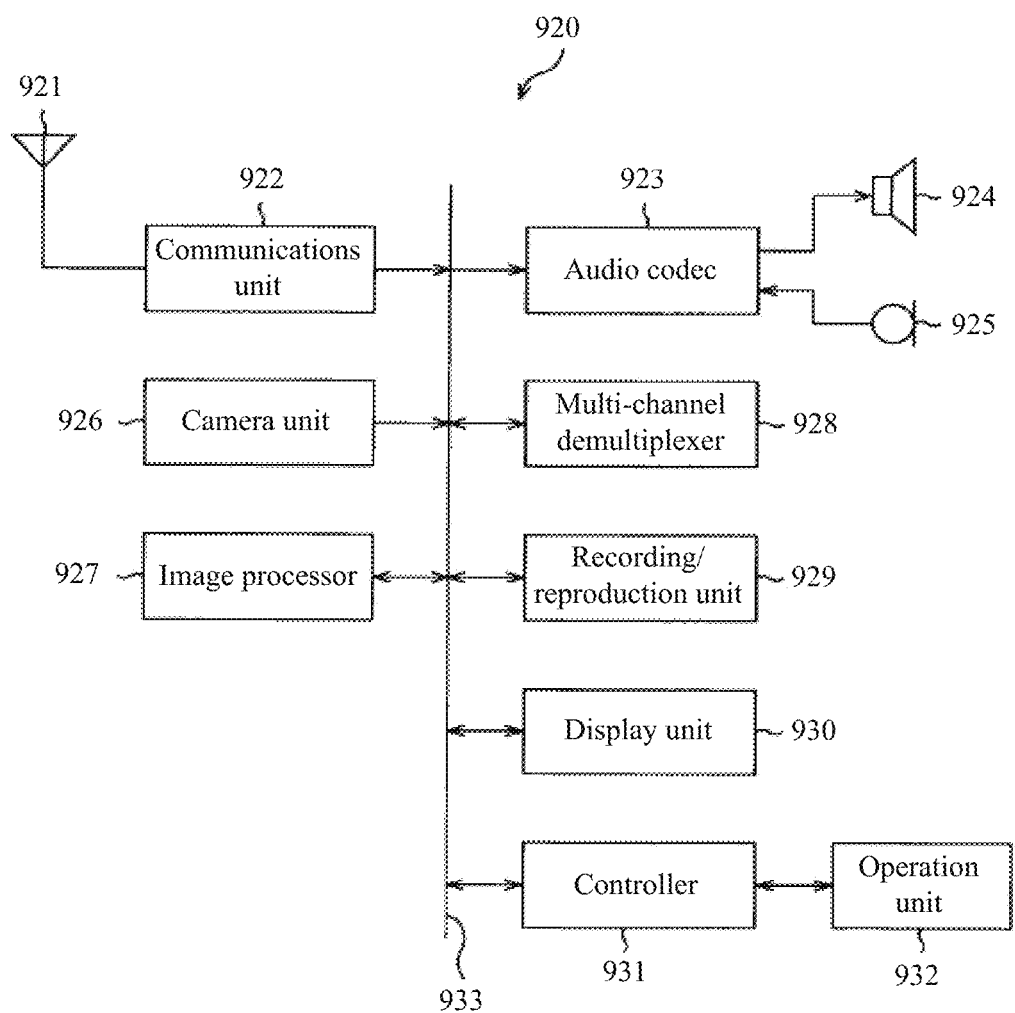
FIG. 22 is a schematic structural diagram of an applicable mobile phone application according to an embodiment of the present invention.

FIG. 22 is a schematic structural diagram of an applicable mobile phone application according to an embodiment of the present invention. A mobile phone apparatus 920 includes an antenna 921, a communications unit 922, an audio codec 923, a loudspeaker 924, a microphone 925, a camera unit 926, an image processor 927, a multi-channel demultiplexer 928, a recording/reproduction unit 929, a display unit 930, a controller 931, an operation unit 932, and a bus 933.

The antenna 921 is connected to the communications unit 922. The loudspeaker 924 and the microphone 925 are connected to the audio codec 923. The operation unit 932 is connected to the controller 931. The bus 933 implements mutual connection between the communications unit 922, the audio codec 923, the camera unit 926, the image processor 927, the multi-channel demultiplexer 928, the recording/reproduction unit 929, the display unit 930, and the controller 931.

The mobile phone apparatus 920 performs operations in various operation modes, for example, audio signal sending/receiving, email and image data sending/receiving, image shooting, and data recording. The various operation modes include a voice call mode, a data communication mode, an imaging mode, and a video phone mode.

In the voice call mode, an analog audio signal generated by the microphone 925 is provided for the audio codec 923. The audio codec 923 converts the analog audio signal to audio data, performs analog-to-digital conversion on the converted-to audio data, and compresses the audio data. Then the audio codec 923 outputs the audio data obtained as a compression result to the communications unit 922. The communications unit 922 encodes and modulates the audio data to generate a to-be-sent signal. Then the communications unit 922 sends the generated to-be-sent signal to a base station by using the antenna 921. The communications unit 922 further amplifies a radio signal received by using the antenna 921, and performs frequency conversion on an amplified radio signal received by using the antenna 921, to obtain a received signal obtained through frequency conversion. Then the communications unit 922 demodulates and decodes the received signal to generate audio data, and outputs the generated audio data to the audio codec 923. The audio codec 923 decompresses the audio data and performs digital-to-analog conversion on the audio data to generate an analog audio signal. Then the audio codec 923 provides the generated audio signal for the loudspeaker 924, so as to output audio from the loudspeaker 924.

In the data communication mode, for example, the controller 931 generates, based on an operation performed by a user by using the operation unit 932, text data to be included in an email. The controller 931 further displays a text on the display unit 930. The controller 931 further generates email data in response to a sending instruction that comes from the user through the operation unit 932, and outputs the generated email data to the communications unit 922. The communications unit 922 encodes and modulates the email data to generate a to-be-sent signal. Then the communications unit 922 sends the generated to-be-sent signal to a base station by using the antenna 921. The communications unit 922 further amplifies a radio signal received by using the antenna 921, and performs frequency conversion on an amplified radio signal received by using the antenna 921, to obtain a received signal obtained through frequency conversion. Then the communications unit 922 demodulates and decodes the received signal to restore the email data, and outputs the restored email data to the controller 931. The controller 931 displays email content on the display unit 930, and stores the email data into a storage medium of the recording/reproduction unit 929.

The recording/reproduction unit 929 includes a readable/writable storage medium. For example, the storage medium may be an internal storage medium, or may be an externally installed storage medium, for example, a hard disk, a magnetic disk, a magneto-optical disk, a USB (Universal Serial Bus) memory, or a memory card.

In the imaging mode, the camera unit 926 performs imaging on an object to generate image data, and outputs the generated image data to the image processor 927. The image processor 927 encodes the image data input from the camera unit 926, and stores an encoded data stream into a storage medium of the storage/reproduction unit 929.

In the video phone mode, the multi-channel demultiplexer 928 multiplexes a video stream encoded by the image processor 927 and an audio stream input by the audio codec 923, and outputs a multiplexed stream to the communications unit 922. The communications unit 922 encodes and modulates the multiplexed stream to generate a to-be-sent signal. Then the communications unit 922 sends the generated to-be-sent signal to a base station by using the antenna 921. The communications unit 922 further amplifies a radio signal received by using the antenna 921, and performs frequency conversion on an amplified radio signal received by using the antenna 921, to obtain a received signal obtained through frequency conversion. The to-be-sent signal and the received signal may include an encoded bitstream. Then the communications unit 922 demodulates and decodes the received signal to restore the stream, and outputs the restored the stream to the multi-channel demultiplexer 928. The multi-channel demultiplexer 928 separates a video stream and an audio stream from an input stream, outputs the video stream to the image processor 927, and outputs the audio stream to the audio codec 923. The image processor 927 decodes the video stream to generate video data. The video data is provided for the display unit 930, and a series of images are displayed by the display unit 930. The audio codec 923 decompresses the audio stream and performs digital-to-analog conversion on the audio stream to generate an analog audio signal. Then the audio codec 923 provides the generated audio signal for the loudspeaker 924, so as to output audio from the loudspeaker 924.

In the mobile phone apparatus 920 having this structure, the image processor 927 has functions of the video encoding apparatus and the video decoding apparatus according to the foregoing embodiments.

In one or more embodiments, the described functions may be implemented by hardware, software, firmware, or any combination thereof. If the functions are implemented by the software, the functions may be stored in a computer readable medium as one or more instructions or code lines (source code), or sent by a computer readable medium, and is/are executed by a processing unit based on the hardware. The computer readable medium may include a computer readable storage medium (which is corresponding to a tangible medium such as a data storage medium) or a communications medium, and the communications medium includes, for example, any medium that promotes transmission of data, by using a computer program, from a place to another place according to a communications protocol. In this manner, the computer readable medium may be roughly corresponding to: (1) a non-instantaneous tangible computer readable storage medium, or (2) for example, a communications medium such as a signal or a carrier. The data storage medium may be any available medium that can be accessed by one or more computers or one or more processors to retrieve an instruction, code, and/or a data structure to implement the technologies described in the present invention. A computer program product may include a computer readable medium.

By way of example and not limitation, some computer readable storage medium may include a RAM, a ROM, an EEPROM, a CD-ROM, another optical disc storage or magnetic disk storage, another magnetic storage apparatus, a flash memory, or any other medium that can store required program code in a form of an instruction or a data structure and can be accessed by a computer. In addition, any connection may be appropriately referred to as a computer readable medium. For example, if an instruction is sent from a website, a server, or another remote source by using a coaxial cable, an optical cable, a twisted pair, a digital subscriber line (DSL), or a wireless technology (for example, infrared, radio, or microwave), the coaxial cable, the optical cable, the twisted pair, the DSL, or the wireless technology (for example, infrared, radio, or microwave) is included in a definition of a medium. However, it should be understood that the computer readable storage medium and the data storage medium may not include a connection, a carrier, a signal, or another transitory medium, but are non-transitory tangible storage media. A disk and an optical disc used in this specification include a compact disc (CD), a laser disc, an optical disc, a digital versatile disc (DVD), a floppy disk, and a Blu-ray disc. The magnetic disk generally magnetically copies data, and the optical disc optically copies data by using a laser. A combination of the foregoing objects shall be further included in the scope of the computer readable medium.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described in this specification may be provided in a dedicated hardware and/or software module configured for encoding and decoding, or may be incorporated into a combined coder-decoder. In addition, the technologies may be completely implemented in one or more circuits or logic elements.

The technologies in the present invention may be widely implemented by a plurality of apparatuses or devices. The apparatuses or devices include a radio handset, an integrated circuit (IC), or an IC set (for example, a chip set). In the present invention, various components, modules, and units are described to emphasize functions of an apparatus that is configured to implement the disclosed technologies, and the functions do not necessarily need to be implemented by different hardware units. Precisely, as described in the foregoing, various units may be combined into a coder-decoder hardware unit, or may be provided by a set of interoperable hardware units (including one or more processors described in the foregoing) and appropriate software and/or firmware.

It should be understood that "one embodiment" or "an embodiment" mentioned in the whole specification means that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A decoding method, comprising:
    parsing a data stream, and
    in response to determining that partitioning an image block with a size of 2N×2N by using a quadtree partition pattern is allowed, processing a 2N×N first subimage block and a 2N×N second subimage block or an N×2N first subimage block and an N×2N second subimage block in a constraint subimage processing mode, wherein the 2N×N first subimage block and the 2N×N second subimage block or the N×2N first subimage block and the N×2N second subimage block are obtained by partitioning the image block with the size of 2N×2N; and
    wherein, in the constraint subimage processing mode, the method comprises:
    determining whether the first subimage block needs to be further partitioned; and
    in response to determining that the first subimage block does not need to be further partitioned, decoding an encoded data stream of the first subimage block; and
    in response to determining that the first subimage block needs to be further partitioned, parsing the data stream to obtain a partition pattern of the first subimage block, and decoding the first subimage block based on the obtained partition pattern of the first subimage block; and
    determining whether the second subimage block needs to be further partitioned; and
    in response to determining that the second subimage block does not need to be further partitioned, decoding an encoded data stream of the second subimage block; and
    in response to determining that the second subimage block needs to be further partitioned, parsing the data stream to obtain a partition pattern of the second subimage block, and decoding the second subimage block based on the obtained partition pattern of the second subimage block, wherein the partition pattern of the second subimage block is constrained by the partition pattern of the first subimage block, wherein an image block partition pattern obtained for the partitioned second subimage block and the partitioned first subimage block is different from an image block partition pattern obtained after the 2N×2N image block is partitioned using the quadtree partition pattern.

2. The decoding method according to claim 1, wherein the partition pattern of the first subimage block is from a first partition pattern set, and the partition pattern of the second subimage block is from a second partition pattern set, wherein the first partition pattern set comprises at least one partition pattern different from all partition patterns in the second partition pattern set.

3. The decoding method according to claim 2, wherein the second partition pattern set is a subset of the first partition pattern set.

4. The decoding method according to claim 1, wherein a first partition pattern set for the first subimage block with the size of 2N×N comprises a horizontal partition pattern and a vertical partition pattern, and the second partition pattern set for the second subimage block with the size of 2N×N comprises the horizontal partition pattern; and a first partition pattern set for the first subimage block with the size of N×2N comprises a horizontal partition pattern and a vertical partition pattern, and a second partition pattern set for the second subimage block with the size of N×2N comprises the vertical partition pattern.

5. The decoding method according to claim 1, wherein the method further comprises: in response to determining that partitioning an image block with a size of 2N×2N using a quadtree partition pattern is not allowed, processing a 2N×N first subimage block and a 2N×N second subimage block or an N×2N first subimage block and an N×2N second subimage block in a non-constraint subimage processing mode, wherein the 2N×N first subimage block and the 2N×N second subimage block or the N×2N first subimage block and the N×2N second subimage block are obtained by partitioning the image block with the size of 2N×2N; and
    wherein, in the non-constraint subimage processing mode, the method comprises:
    determining whether the first subimage block needs to be further partitioned; and
    in response to determining that the first subimage block does not need to be further partitioned, decoding an encoded data stream of the first subimage block; and in response to determining that the first subimage block needs to be further partitioned, parsing the data stream to obtain a partition pattern of the first subimage block, and decoding the first subimage block based on the obtained partition pattern of the first subimage block, wherein the partition pattern of the first subimage block is from a first partition pattern set; and determining whether the second subimage block needs to be further partitioned; and in response to determining that the second subimage block does not need to be further partitioned, decoding an encoded data stream of the second subimage block; and in response to determining that the second subimage block needs to be further partitioned, parsing the data stream to obtain a partition pattern of the second subimage block, and decoding the second subimage block based on the obtained partition pattern of the second subimage block, wherein the partition pattern of the second subimage block is from a second partition pattern set, and all partition patterns in the first partition pattern set are the same as all partition patterns in the second partition pattern set.

6. The decoding method according to claim 1, wherein that the partition pattern of the second subimage block is constrained by the partition pattern of the first subimage block comprises:

in response to determining that the first subimage block and the second subimage block have a size of 2N×N and the partition pattern of the first subimage block is a vertical partition pattern, the partition pattern of the second subimage block is horizontal partition; and in response to determining that the first subimage block and the second subimage block have a size of 2N×N and the partition pattern of the first subimage block is a non-vertical partition pattern, the partition pattern of the second subimage block is vertical partition or horizontal partition; or in response to determining that the first subimage block and the second subimage block have a size of N×2N and the partition pattern of the first subimage block is horizontal partition, the partition pattern of the second subimage block is vertical partition; and in response to determining that the first subimage block and the second subimage block have a size of N×2N and the partition pattern of the first subimage block is non-horizontal partition, the partition pattern of the second subimage block is horizontal partition or vertical partition.

7. The decoding method according to claim 1, wherein the 2N×2N image block is located within an I slice.

8. A decoding method, comprising:
parsing a data stream, and
in response to determining that partitioning an image block with a size of 2N×2N using a quadtree partition pattern is allowed, processing a 2N×N first subimage block and a 2N×N second subimage block or an N×2N first subimage block and an N×2N second subimage block in a constraint subimage processing mode, wherein the 2N×N first subimage block and the 2N×N second subimage block or the N×2N first subimage block and the N×2N second subimage block are obtained by partitioning the image block with the size of 2N×2N; and wherein, in the constraint subimage processing mode, the method comprises:

parsing the data stream to determine a partition identifier of the first subimage block;

determining a partition pattern of the first subimage block based on the partition identifier of the first subimage block, and decoding the first subimage block based on the partition pattern of the first subimage block; and parsing the data stream to determine a partition identifier of the second subimage block;

determining a partition pattern of the second subimage block based on the partition identifier of the second subimage block; and decoding the second subimage block based on the partition pattern of the second subimage block, wherein the partition pattern of the second subimage block is constrained by the partition pattern of the first subimage block, wherein an image block partition pattern obtained for the partitioned second subimage block and the partitioned first subimage block is different from an image block partition pattern obtained after the 2N×2N image block is partitioned using the quadtree partition pattern.

9. The decoding method according to claim 8, wherein the partition pattern of the first subimage block is from a first partition pattern set, and the partition pattern of the second subimage block is from a second partition pattern set, wherein the first partition pattern set comprises at least one partition pattern different from all partition patterns in the second partition pattern set.

10. The decoding method according to claim 9, wherein the second partition pattern set is a subset of the first partition pattern set.

11. The decoding method according to claim 9, wherein for the 2N×N first subimage block and the 2N×N second subimage block, the first partition pattern set comprises no partition, a horizontal partition pattern, and a vertical partition pattern, and the second partition pattern set comprises no partition and the horizontal partition pattern; and for the N×2N first subimage block and the N×2N second subimage block, the first partition pattern set comprises no partition, a horizontal partition pattern, and a vertical partition pattern, and the second partition pattern set comprises no partition and the vertical partition pattern.

12. The decoding method according to claim 8, wherein the partition pattern of the first subimage block is different from the partition pattern of the second subimage block, and the partition pattern is direction partition.

13. The decoding method according to claim 8, wherein that the partition pattern of the second subimage block is constrained by the partition pattern of the first subimage block comprises:

in response to determining that the first subimage block and the second subimage block have a size of 2N×N and the partition pattern of the first subimage block is a vertical partition pattern, the partition pattern of the second subimage block is no partition or horizontal partition; and in response to determining that the first subimage block and the second subimage block have a size of 2N×N and the partition pattern of the first subimage block is a non-vertical partition pattern, the partition pattern of the second subimage block is no partition, vertical partition, or horizontal partition; and in response to determining that the first subimage block and the second subimage block have a size of N×2N and the partition pattern of the first subimage block is horizontal partition, the partition pattern of the second subimage block is no partition or vertical partition; and in response to determining that the first subimage block and the second subimage block have a size of N×2N and the partition pattern of the first subimage block is non-horizontal partition, the partition pattern of the second subimage block is no partition, horizontal partition, or vertical partition.

14. The decoding method according to claim 8, wherein the method further comprises:

in response to determining that partitioning the 2N×2N image block using a quadtree partition pattern is not allowed, processing encoded data streams of the first subimage block and the second subimage block in a non-constraint subimage processing mode, wherein, in the non-constraint subimage processing mode, the method comprises:

parsing the data stream to determine a partition identifier of the first subimage block;

determining a partition pattern of the first subimage block based on the partition identifier of the first subimage block; and decoding the first subimage block based on the partition pattern of the first subimage block; and parsing the data stream to determine a partition identifier of the second subimage block;

determining a partition pattern of the second subimage block based on the partition identifier of the second subimage block; and decoding the second subimage block based on the partition pattern of the second subimage block, wherein the partition pattern of the first subimage block and the partition pattern of the second subimage block are selected from a same partition pattern set.

15. The decoding method according to claim 8, wherein the 2N×2N image block is located within an I slice.

16. An encoding method, comprising:

in response to determining that partitioning an image block with a size of 2N×2N using a quadtree partition pattern is allowed, processing a 2N×N first subimage block and a 2N×N second subimage block or an N×2N first subimage block and an N×2N second subimage block in a constraint subimage processing mode, wherein the 2N×N first subimage block and the 2N×N second subimage block or the N×2N first subimage block and the N×2N second subimage block are obtained by partitioning the image block with the size of 2N×2N; and wherein, in the constraint subimage processing mode, the method comprises:

determining whether the first subimage block needs to be further partitioned; and in response to determining that the first subimage block does not need to be further partitioned, encoding the first subimage block to generate an encoded data stream; and in response to determining that the first subimage block needs to be further partitioned, determining a partition pattern of the first subimage block;

partitioning the first subimage block based on the partition pattern of the first subimage block; and encoding the partition pattern of the first subimage block and the partitioned first subimage block; and determining whether the second subimage block needs to be further partitioned; and in response to determining that the second subimage block does not need to be further partitioned, encoding the second subimage block to generate an encoded data stream; and in response to determining that the second subimage block needs to be further partitioned, determining a partition pattern of the second subimage block;

partitioning the second subimage block based on the partition pattern of the second subimage block; and encoding the partition pattern of the second subimage block and the partitioned second subimage block, wherein the partition pattern of the second subimage block is constrained by the partition pattern of the first subimage block, wherein an image block partition pattern obtained for the partitioned second subimage block and the partitioned first subimage block is different from an image block partition pattern obtained after the 2N×2N image block is partitioned using the quadtree partition pattern.

17. An encoding method, comprising:

in response to determining that partitioning an image block with a size of 2N×2N using a quadtree partition pattern is allowed, processing a 2N×N first subimage block and a 2N×N second subimage block or an N×2N first subimage block and an N×2N second subimage block in a constraint subimage processing mode, wherein the 2N×N first subimage block and the 2N×N second subimage block or the N×2N first subimage block and the N×2N second subimage block are obtained by partitioning the image block with the size of 2N×2N; and wherein, in the constraint subimage processing mode, the method comprises:

determining a partition pattern of the first subimage block;

encoding the partition pattern of the first subimage block; and encoding the first subimage block based on the partition pattern of the first subimage block;

determining a partition pattern of the second subimage block;

encoding the partition pattern of the second subimage block; and encoding the second subimage block based on the partition pattern of the second subimage block, wherein the partition pattern of the second subimage block is constrained by the partition pattern of the first subimage block, wherein an image block partition pattern obtained for the partitioned second subimage block and the partitioned first subimage block is different from an image block partition pattern obtained after the 2N×2N image block is partitioned using the quadtree partition pattern.

18. A decoding apparatus, comprising:

at least one processor; and a non-transitory computer-readable storage medium coupled to the at least one processor and storing programming instructions for execution by the at least one processor, wherein the programming instructions instruct the at least one processor to:

parse a data stream, and in response to determining that partitioning an image block with a size of 2N×2N using a quadtree partition pattern is allowed, process a 2N×N first subimage block and a 2N×N second subimage block or an N×2N first subimage block and an N×2N second subimage block in a constraint subimage processing mode, wherein the 2N×N first subimage block and the 2N×N second subimage block or the N×2N first subimage block and the N×2N second subimage block are obtained by partitioning the image block with the size of 2N×2N; and wherein, in the constraint subimage processing mode, the programming instructions instruct the at least one processor to:

determine whether the first subimage block needs to be further partitioned; and in response to determining that the first subimage block does not need to be further partitioned, decode an encoded data stream of the first subimage block; and in response to determining that the first subimage block needs to be further partitioned, parse the data stream to obtain a partition pattern of the first subimage block; and decode the first subimage block based on the obtained partition pattern of the first subimage block; and determine whether the second subimage block needs to be further partitioned; and in response to determining that the second subimage block does not need to be further partitioned, decode an encoded data stream of the second subimage block; and in response to determining that the second subimage block needs to be further partitioned, parse the data stream to obtain a partition pattern of the second subimage block; and decode the second subimage block based on the obtained partition pattern of the second subimage block, wherein the partition pattern of the second subimage block is constrained by the partition pattern of the first subimage block, wherein an image block partition pattern obtained for the partitioned second subimage block and the partitioned first subimage block is different from an image block partition pattern obtained after the 2N×2N image block is partitioned using the quadtree partition pattern.

19. The decoding apparatus according to claim 18, wherein the partition pattern of the first subimage block is from a first partition pattern set, and the partition pattern of the second subimage block is from a second partition pattern set, wherein the first partition pattern set comprises at least one partition pattern different from all partition patterns in the second partition pattern set.

20. The decoding apparatus according to claim 19, wherein the second partition pattern set is a subset of the first partition pattern set.

21. The decoding apparatus according to claim 18, wherein a first partition pattern set for the first subimage block with the size of 2N×N comprises a horizontal partition pattern and a vertical partition pattern, and a second partition pattern set for the second subimage block with the size of 2N×N comprises the horizontal partition pattern; and a first partition pattern set for the first subimage block with the size of N×2N comprises a horizontal partition pattern and a vertical partition pattern, and a second partition pattern set for the second subimage block with the size of 2N×N comprises the vertical partition pattern.

22. The decoding apparatus according to claim 18, wherein the programming instructions instruct the at least one processor to:

in response to determining that partitioning an image block with a size of 2N×2N using a quadtree partition pattern is not allowed, process a 2N×N first subimage block and a 2N×N second subimage block or an N×2N first subimage block and an N×2N second subimage block in a non-constraint subimage processing mode, wherein the 2N×N first subimage block and the 2N×N second subimage block or the N×2N first subimage block and the N×2N second subimage block are obtained by partitioning the image block with the size of 2N×2N; and wherein, in the non-constraint subimage processing mode, the programming instructions instruct the at least one processor to:

determine whether the first subimage block needs to be further partitioned; and in response to determining that the first subimage block does not need to be further partitioned, decode an encoded data stream of the first subimage block; and in response to determining that the first subimage block needs to be further partitioned, parse the data stream to obtain a partition pattern of the first subimage block, and decode the first subimage block based on the obtained partition pattern of the first subimage block, wherein the partition pattern of the first subimage block is from a first partition pattern set; and determine whether the second subimage block needs to be further partitioned; and in response to determining that the second subimage block does not need to be further partitioned, decode an encoded data stream of the second subimage block; and in response to determining that the second subimage block needs to be further partitioned, parse the data stream to obtain a partition pattern of the second subimage block, and decode the second subimage block based on the obtained partition pattern of the second subimage block, wherein the partition pattern of the second subimage block is from a second partition pattern set, and all partition patterns in the first partition pattern set are the same as all partition patterns in the second partition pattern set.

23. The decoding apparatus according to claim 18, wherein that the partition pattern of the second subimage block is constrained by the partition pattern of the first subimage block comprises:

in response to determining that the first subimage block and the second subimage block have a size of 2N×N and the partition pattern of the first subimage block is a vertical partition pattern, the partition pattern of the second subimage block is horizontal partition; and in response to determining that the first subimage block and the second subimage block have a size of 2N×N and the partition pattern of the first subimage block is a non-vertical partition pattern, the partition pattern of the second subimage block is vertical partition or horizontal partition; and in response to determining that the first subimage block and the second subimage block have a size of N×2N and the partition pattern of the first subimage block is horizontal partition, the partition pattern of the second subimage block is vertical partition; and in response to determining that the first subimage block and the second subimage block have a size of N×2N and the partition pattern of the first subimage block is non-horizontal partition, the partition pattern of the second subimage block is horizontal partition or vertical partition.

24. The decoding apparatus according to claim 18, wherein the 2N×2N image block is located within an I slice.

25. A decoding apparatus, comprising:

at least one processor; and a non-transitory computer-readable storage medium coupled to the at least one processor and storing programming instructions for execution by the at least one processor, wherein the programming instructions instruct the at least one processor to:
parse a data stream, and
in response to determining that partitioning an image block with a size of 2N×2N using a quadtree partition pattern is allowed, process a 2N×N first subimage block and a 2N×N second subimage block or an N×2N first subimage block and an N×2N second subimage block in a constraint subimage processing mode, wherein the 2N×N first subimage block and the 2N×N second subimage block or the N×2N first subimage block and the N×2N second subimage block are obtained by partitioning the image block with the size of 2N×2N; and
wherein, in the constraint subimage processing mode, the programming instructions instruct the at least one processor to:
parse the data stream to determine a partition identifier of the first subimage block;
determine a partition pattern of the first subimage block based on the partition identifier of the first subimage block; and
decode the first subimage block based on the partition pattern of the first subimage block; and
parse the data stream to determine a partition identifier of the second subimage block;
determine a partition pattern of the second subimage block based on the partition identifier of the second subimage block; and
decode the second subimage block based on the partition pattern of the second subimage block, wherein the partition pattern of the second subimage block is constrained by the partition pattern of the first subimage block, wherein an image block partition pattern obtained for the partitioned second subimage block and the partitioned first subimage block is different from an image block partition pattern obtained after the 2N×2N image block is partitioned using the quadtree partition pattern.

26. The decoding apparatus according to claim 25, wherein the partition pattern of the first subimage block is from a first partition pattern set, and the partition pattern of the second subimage block is from a second partition pattern set, wherein the first partition pattern set comprises at least one partition pattern different from all partition patterns in the second partition pattern set.

27. The decoding apparatus according to claim 26, wherein the second partition pattern set is a subset of the first partition pattern set.

28. The decoding apparatus according to claim 26, wherein for the 2N×N first subimage block and the 2N×N second subimage block, the first partition pattern set comprises no partition, a horizontal partition pattern, and a vertical partition pattern, and the second partition pattern set comprises no partition and the horizontal partition pattern; and for the N×2N first subimage block and the N×2N second subimage block, the first partition pattern set comprises no partition, a horizontal partition pattern, and a vertical partition pattern, and the second partition pattern set comprises no partition and the vertical partition pattern.

29. The decoding apparatus according to claim 25, wherein the partition pattern of the first subimage block is different from the partition pattern of the second subimage block, and the partition pattern is direction partition.

30. The decoding apparatus according to claim 25, wherein that the partition pattern of the second subimage block is constrained by the partition pattern of the first subimage block comprises:
in response to determining that the first subimage block and the second subimage block have a size of 2N×N and the partition pattern of the first subimage block is a vertical partition pattern, the partition pattern of the second subimage block is no partition or horizontal partition; and
in response to determining that the first subimage block and the second subimage block have a size of 2N×N and the partition pattern of the first subimage block is a non-vertical partition pattern, the partition pattern of the second subimage block is no partition, vertical partition, or horizontal partition; and
in response to determining that the first subimage block and the second subimage block have a size of N×2N and the partition pattern of the first subimage block is horizontal partition, the partition pattern of the second subimage block is no partition or vertical partition; and
in response to determining that the first subimage block and the second subimage block have a size of N×2N and the partition pattern of the first subimage block is non-horizontal partition, the partition pattern of the second subimage block is no partition, horizontal partition, or vertical partition.

31. The decoding apparatus according to claim 25, wherein the programming instructions instruct the at least one processor to:
in response to determining that partitioning the 2N×2N image block using a quadtree partition pattern is not allowed, process encoded data streams of the first subimage block and the second subimage block in a non-constraint subimage processing mode; and
wherein, in the non-constraint subimage processing mode, the programming instructions instruct the at least one processor to:
parse the data stream to determine a partition identifier of the first subimage block;
determine a partition pattern of the first subimage block based on the partition identifier of the first subimage block; and
decode the first subimage block based on the partition pattern of the first subimage block; and
parse the data stream to determine a partition identifier of the second subimage block;
determine a partition pattern of the second subimage block based on the partition identifier of the second subimage block; and
decode the second subimage block based on the partition pattern of the second subimage block, wherein the partition pattern of the first subimage block and the partition pattern of the second subimage block are selected from a same partition pattern set.

32. The decoding apparatus according to claim 25, wherein the 2N×2N image block is located within an I slice.

33. An encoding apparatus, comprising:
at least one processor; and
a non-transitory computer-readable storage medium coupled to the at least one processor and storing programming instructions for execution by the at least one processor, wherein the programming instructions instruct the at least one processor to:
in response to determining that partitioning an image block with a size of 2N×2N using a quadtree partition pattern is allowed, process a 2N×N first subimage block and a 2N×N second subimage block or an N×2N first subimage block and an N×2N second subimage block in a constraint subimage processing mode, wherein the 2N×N first subimage block and the 2N×N second subimage block or the N×2N first subimage block and the N×2N second subimage block are obtained by partitioning the image block with the size of 2N×2N; and wherein, in the constraint subimage processing mode, the programming instructions instruct the at least one processor to:

determine whether the first subimage block needs to be further partitioned; and in response to determining that the first subimage block does not need to be further partitioned, encode the first subimage block to generate an encoded data stream; and in response to determining that the first subimage block needs to be further partitioned, determine a partition pattern of the first subimage block, partition the first subimage block based on the partition pattern of the first subimage block; and encode the partition pattern of the first subimage block and the partitioned first subimage block; and determine whether the second subimage block needs to be further partitioned; and in response to determining that the second subimage block does not need to be further partitioned, encode the second subimage block to generate an encoded data stream; and in response to determining that the second subimage block needs to be further partitioned, determine a partition pattern of the second subimage block; partition the second subimage block based on the partition pattern of the second subimage block; and encode the partition pattern of the second subimage block and the partitioned second subimage block, wherein the partition pattern of the second subimage block is constrained by the partition pattern of the first subimage block, wherein an image block partition pattern obtained for the partitioned second subimage block and the partitioned first subimage block is different from an image block partition pattern obtained after the 2N×2N image block is partitioned using the quadtree partition pattern.

34. An encoding apparatus, comprising:
at least one processor; and
a non-transitory computer-readable storage medium coupled to the at least one processor and storing programming instructions for execution by the at least one processor, wherein the programming instructions instruct the at least one processor to:

in response to determining that partitioning an image block with a size of 2N×2N using a quadtree partition pattern is allowed, process a 2N×N first subimage block and a 2N×N second subimage block or an N×2N first subimage block and an N×2N second subimage block in a constraint subimage processing mode, wherein the 2N×N first subimage block and the 2N×N second subimage block or the N×2N first subimage block and the N×2N second subimage block are obtained by partitioning the image block with the size of 2N×2N; and wherein, in the constraint subimage processing mode, the programming instructions instruct the at least one processor to:

determine a partition pattern of the first subimage block;
encode the partition pattern of the first subimage block; and encode the first subimage block based on the partition pattern of the first subimage block;

determine a partition pattern of the second subimage block;

encode the partition pattern of the second subimage block; and encode the second subimage block based on the partition pattern of the second subimage block, wherein the partition pattern of the second subimage block is constrained by the partition pattern of the first subimage block, wherein an image block partition pattern obtained for the partitioned second subimage block and the partitioned first subimage block is different from an image block partition pattern obtained after the 2N×2N image block is partitioned using the quadtree partition pattern.

* * * * *

UNITED STATES PATENT AND TRADEMARK OFFICE
CERTIFICATE OF CORRECTION

PATENT NO. : 10,812,835 B2
APPLICATION NO. : 16/233932
DATED : October 20, 2020
INVENTOR(S) : Zhao Wang et al.

Page 1 of 1

It is certified that error appears in the above-identified patent and that said Letters Patent is hereby corrected as shown below:

On the Title Page

Item (56) in Column 2 (Other Publications), Line 2, delete "Generva;" and insert -- Geneva; --, therefor.

Item (57) in Column 2 (Abstract), Line 4, delete "2N×2N" and insert -- 2N×N --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*